(12) United States Patent
Grann et al.

(10) Patent No.: US 11,624,879 B2
(45) Date of Patent: Apr. 11, 2023

(54) MULTI-CHANNEL OPTICAL COUPLER

(71) Applicant: Inneos LLC, Pleasanton, CA (US)

(72) Inventors: Eric Grann, Pleasanton, CA (US); Scott Fluegel, Pleasanton, CA (US); Ihi Nzeadibe, Pleasanton, CA (US)

(73) Assignee: Inneos, LLC, Pleasanton, CA (US)

( * ) Notice: Subject to any disclaimer, the term of this patent is extended or adjusted under 35 U.S.C. 154(b) by 0 days.

(21) Appl. No.: 16/967,264

(22) PCT Filed: Jan. 31, 2019

(86) PCT No.: PCT/US2019/015992
§ 371 (c)(1),
(2) Date: Aug. 4, 2020

(87) PCT Pub. No.: WO2019/152612
PCT Pub. Date: Aug. 8, 2019

(65) Prior Publication Data
US 2020/0363595 A1    Nov. 19, 2020

Related U.S. Application Data

(60) Provisional application No. 62/626,462, filed on Feb. 5, 2018.

(51) Int. Cl.
*G02B 6/42* (2006.01)
*H04J 14/02* (2006.01)

(52) U.S. Cl.
CPC ......... *G02B 6/4214* (2013.01); *G02B 6/4215* (2013.01); *G02B 6/4249* (2013.01); *G02B 6/4292* (2013.01); *H04J 14/0278* (2013.01)

(58) Field of Classification Search
CPC ........................................................ G02B 6/42
(Continued)

(56) References Cited

U.S. PATENT DOCUMENTS 5,369,661 A * 11/1994 Yamaguchi ......... H01S 3/09415
372/71
6,198,864 B1   3/2001 Lemoff et al.
(Continued)

FOREIGN PATENT DOCUMENTS

CN        1790076 A     6/2006
CN      106019484 A    10/2016
(Continued)

*Primary Examiner* — Kaveh C Kianni
(74) *Attorney, Agent, or Firm* — Murphy, Bilak & Homiller, PLLC

(57) ABSTRACT

Exemplary multi-channel optical couplers include a molded coupling module comprising a first surface, a second surface, a lens array receptacle, and fiber receptacles for optical fibers; an optical arrangement comprising: a particular surface carrying a reflective coating, and a further surface carrying a plurality of optical filters, each configured to pass a single optical wavelength; a first lens array configured such that each lens is optically aligned with the plurality of optical filters via at least the reflective coating, and with a position, within a particular fiber receptacle, corresponding to the end of a particular optical fiber; a second lens array arranged with the second surface such that each lens is optically aligned with an optical filter. The optical block and lens arrays can be configured such that the optical coupler produces no more than −10 dB of crosstalk on any of the optical wavelengths passed by the optical filters.

20 Claims, 12 Drawing Sheets

(58) Field of Classification Search
USPC .......................................................... 385/14
See application file for complete search history.

(56) References Cited

U.S. PATENT DOCUMENTS

| | | | |
|---|---|---|---|
| 6,201,908 B1 * | 3/2001 | Grann .................. | G02B 6/2938 385/47 |
| 6,396,978 B1 * | 5/2002 | Grann ................ | G02B 6/29358 385/74 |
| 6,456,757 B2 | 9/2002 | Kim et al. | |
| 6,558,046 B2 | 5/2003 | Griffis et al. | |
| 6,572,278 B2 | 6/2003 | Hsieh et al. | |
| 6,652,161 B2 | 11/2003 | Grann et al. | |
| 6,751,379 B2 * | 6/2004 | Capewell ............. | G02B 6/4246 385/36 |
| 6,758,611 B1 | 7/2004 | Levin et al. | |
| 6,937,786 B2 | 8/2005 | Lemoff | |
| 7,532,826 B2 | 5/2009 | Zhu et al. | |
| 7,653,278 B2 * | 1/2010 | Hamada ................. | G02B 1/045 385/129 |
| 9,229,167 B2 | 1/2016 | Chang | |
| 9,325,445 B2 | 4/2016 | Wang et al. | |
| 9,692,516 B2 | 6/2017 | Zhou et al. | |
| 9,995,880 B1 * | 6/2018 | Ding ................. | G02B 6/29367 |
| 10,088,639 B2 * | 10/2018 | Mentovich ........... | G02B 6/4206 |
| 10,698,167 B2 * | 6/2020 | DeMeritt ............... | G02B 6/423 |
| 11,002,926 B1 * | 5/2021 | Mathai ................. | G02B 6/4284 |
| 2002/0168153 A1 | 11/2002 | Yamabayashi et al. | |
| 2004/0101258 A1 | 5/2004 | Aronson et al. | |
| 2005/0018981 A1 | 1/2005 | Modavis et al. | |
| 2008/0226229 A1 * | 9/2008 | Nakagawa ................ | H01S 5/50 385/33 |
| 2009/0097847 A1 * | 4/2009 | Hosomi ............... | G02B 6/4246 398/43 |
| 2009/0263087 A1 | 10/2009 | Oshima et al. | |
| 2011/0081112 A1 * | 4/2011 | Nakagawa ............. | G02B 6/425 359/619 |
| 2013/0064498 A1 | 3/2013 | Chou | |
| 2015/0110493 A1 * | 4/2015 | Khor ....................... | H04J 14/02 398/88 |
| 2015/0125120 A1 | 5/2015 | Kurashima | |
| 2020/0041727 A1 * | 2/2020 | Yamamoto ........... | G02B 6/4206 |
| 2020/0343695 A1 * | 10/2020 | Mathai ................. | H01S 5/4012 |

FOREIGN PATENT DOCUMENTS

| | | |
|---|---|---|
| EP | 1447695 A2 | 8/2004 |
| JP | 2000162466 A | 6/2000 |
| WO | 2019152620 A1 | 8/2019 |

* cited by examiner

MULTI-CHANNEL OPTICAL COUPLER

RELATED APPLICATIONS

The present application claims the benefit of priority from U.S. Provisional Patent Application No. 62/626,462 filed on Feb. 5, 2018, the entire disclosure of which is incorporated herein by reference for all purposes.

TECHNICAL FIELD

The present application relates generally to the field of optical communications, and more specifically to devices that couples multiple optical channels (e.g., wavelengths) onto two or more optical fibers.

BACKGROUND

In wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications. Furthermore, a single optical channel in a fiber waveguide uses a very small fraction of the available bandwidth of the fiber—typically a few Gigahertz (GHz) out of several tens of Terahertz (THz) available. By transmitting several channels at different optical wavelengths into a fiber—typically referred to as "wavelength division multiplexing" or "WDM"—this bandwidth may be utilized more efficiently.

In typical operation, an optical multiplexing device (also referred to as an "optical coupler") combines or separates multiple light signals with varying optical frequencies or, equivalently, wavelengths. Such optical multiplexing devices have applications for both dense and coarse wavelength division multiplexing (DWDM and CWDM) for both multi-mode and signal-mode fiber optic data communications and telecommunications. Multiple-wavelength light sources can be combined into a single optical path for transmission, or multi-wavelength light travelling in a single optical path can be separated into multiple narrow spectral bands that can be focused onto individual fiber optic carriers or detectors.

Current optical couplers can be configured to operate with a single optical fiber carrying a wavelength-multiplexed light source. An example of such a device is described in U.S. Pat. No. 6,201,908. Many applications, however, utilize multiple optical fibers. Such applications include backbone and premises distribution. Multiple fibers also may be necessary to facilitate separation of secure information from other secure or non-secure information. In such cases, an optical coupler is required for each of the optical fibers. One benefit to the per-fiber separation of the optical coupling is that the crosstalk between signals on the respective fibers can be effectively reduced or minimized "Crosstalk" often refers to a portion of a signal carried on a first channel that appears as undesired noise and/or interference on a second channel that is proximate in some way to the first channel.

Nevertheless, the significant drawbacks or problems with such an arrangement include additional size and cost due to individual optical and electronic components required for each fiber connection. Accordingly, it can be beneficial to address at least some of these issues and/or problems with an improved optical coupler design for multi-fiber applications.

SUMMARY

Accordingly, to address at least some of such issues and/or problems, certain exemplary embodiments according to the present disclosure can provide a highly-integrated, multi-channel optical coupler with a reduced amount of crosstalk between the channels, e.g., no more than −10 dB. As such, exemplary embodiments of methods, systems, devices, and computer-readable media according to the present disclosure can vastly out-perform conventional methods, techniques, and systems in various known applications, including exemplary applications discussed herein.

Certain exemplary embodiments of the present disclosure include an optical coupler for a plurality of optical fibers, comprising: a molded coupling module comprising a first surface, a second surface, a lens array receptacle, and one or more fiber receptacles for ends of a plurality of optical fibers; an optical arrangement comprising: a particular surface carrying a reflective coating, and a further surface opposite the particular surface and carrying a plurality of optical filters, each configured to pass a single wavelength carried by one or more of the fibers coupled to the fiber receptacle. The optical coupler can also include a first lens array arranged with the lens array receptacle such that each lens in the first lens array is optically aligned with the plurality of optical filters via at least the reflective coating and a position, within a particular one of the fiber receptacles, corresponding to the end of a particular optical fiber. The optical coupler can also include a second lens array arranged with the second surface of the molded coupling module such that each lens of the second lens array is optically aligned with a corresponding one of the optical filters. In such embodiments, at least one of the optical block, the first lens array, and the second lens array can be configured such that the optical coupler produces no more than −10 dB of crosstalk on any of the optical wavelengths passed by the plurality of optical filters.

In some exemplary embodiments, the optical coupler can further comprise one or more optical beam reflectors arranged with the second surface of the molded coupling module, such that the first lens array is optically aligned with the plurality of optical filters via the one or more optical beam reflectors and the reflective coating. In some exemplary embodiments, the further surface of the optical block is mounted to the first surface of the molded coupling module such that the first lens array is optically aligned with the plurality of optical filters via only the reflective coating.

In some exemplary embodiments, the first array can be configured such that each lens in the first array is non-collimating with respect to light received from a corresponding fiber. In some exemplary embodiments, each lens in the first array focuses light received from the corresponding fiber.

In other exemplary embodiments, the optical block can be configured such that the further surface carries a substantially opaque coating having a footprint that substantially surrounds the perimeter of the plurality of optical fibers and substantially covers any intermediate gaps between the plurality of optical fibers without substantially interfering with the direct optical paths through the plurality of optical filters. In some exemplary embodiments, the plurality of optical filters can be arranged in an array comprising a number of rows corresponding to the plurality of fibers and a number of columns corresponding to the plurality of optical wavelengths carried by each optical fiber. In some exemplary embodiments, all optical filters of a particular column can be configured to pass the same optical wavelength. In other exemplary embodiments, a subset of the optical filters of a particular column can be configured to pass a different optical wavelength than a different subset of the optical filters of the particular column.

In some exemplary embodiments, each lens in the second array is non-collimating with respect to light received from the corresponding optical filter. In some exemplary embodiments, each lens in the second array expands light received from the corresponding optical filter.

In some exemplary embodiments, the first and second surfaces can be substantially parallel and the second lens array can comprise a plurality of off-axis, aspherical lenses. In other exemplary embodiments, the first and second surfaces can be substantially non-parallel and the second lens array can comprise a plurality of on-axis, aspherical lenses.

In some exemplary embodiments, the optical coupler can be configured to couple eight fibers, each fiber carrying at least two optical wavelengths. In some exemplary embodiments, the optical coupler can be configured to couple twelve fibers, each fiber carrying at least two optical wavelengths. In some exemplary embodiments, the optical coupler can be configured to couple two fibers, each fiber carrying at least four optical wavelengths.

In some exemplary embodiments, the optical arrangement comprises an optical block having the particular surface and the further surface on opposite faces, with the further surface of the optical block mounted to the first surface of the molded coupling module. In some exemplary embodiments, the molded coupling module comprises the further surface on which the plurality of optical filters can be mounted. In such embodiments, the particular surface carrying the reflective coating can be mounted to the first surface of the molded coupling module, such that a cavity can exist between the reflective coating and the plurality of optical fibers.

In some exemplary embodiments, the optical coupler can include a plurality of optical inserts, each optical insert coupled to a particular lens comprising the first array and positioned in optical alignment between the particular lens and the end of the corresponding fiber coupled to the one or more fiber receptacles. In some exemplary embodiments, the one or more fiber receptacles can be configured to mate with a plurality of multi-mode fibers having respective ends polished to angles, relative to the respective longitudinal axes of the fibers, of less than or equal to 85 degrees.

In some exemplary embodiments, the one or more fiber receptacles comprise a plurality of fiber stubs, with each stub corresponds to a particular fiber of the plurality of multi-mode fibers, and with each stub having an end polished at a particular angle to mate with the polished end of the corresponding particular fiber. In some exemplary embodiments at least one of the fiber receptacles can comprise a ferrule configured to receive ends of two multi-mode fibers. In some exemplary embodiments, the optical coupler can include at least one retaining clip configured to hold the optical coupler to one or more fibers inserted therein in a substantially fixed arrangement.

In some exemplary embodiments, the first lens array can be insertable within the lens array receptacle. In other exemplary embodiments, the first lens array can be integrally formed within the lens array receptacle. In some exemplary embodiments, the second lens array can be mounted to the second surface of the molded coupling module. In other exemplary embodiments, the second lens array can be integrally formed with the second surface of the molded coupling module.

Other exemplary embodiments include a wavelength-division multiplexer comprising one or more embodiments of the optical coupler, and further comprising a substrate; and a plurality of light sources mounted to the substrate and configured such that each light source is optically aligned with a corresponding lens of the second array. Other exemplary embodiments include a wavelength-division demultiplexer comprising one or more embodiments of the optical coupler, and further comprising a substrate; and a plurality of photodiodes mounted to the substrate and configured such that each photodiode is optically aligned with a corresponding lens of the second lens array.

Other exemplary embodiments include a wavelength-division transmitter/receiver comprising one or more embodiments of the optical coupler, and further comprising a substrate; a plurality of photodiodes mounted to the substrate and configured such that each photodiode is optically aligned with a corresponding lens of a first portion of the second lens array; and a plurality of light sources mounted to the substrate and configured such that each light source is optically aligned with a corresponding lens of a second portion of the second lens array. Other exemplary embodiments can include a fiber-to-fiber multiplexer/demultiplexer comprising one or more embodiments of the optical substrate, and further comprising a substrate and a further plurality of fiber receptacles mounted to the substrate such that such that, within each of the further fiber receptacles, a position corresponding to the end of an optical fiber is optically aligned with a corresponding lens of the second lens array.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which:

FIG. 11, which includes

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

As briefly mentioned above, a benefit of per-fiber separation in multi-fiber optical coupling is that the crosstalk between channels on the respective fibers can be effectively reduced and/or minimized. As also mentioned above, however, there are significant drawbacks or problems with such arrangements, including the additional size and cost of the coupling components replicated for each fiber connection. Accordingly, there is a need for an improved multi-fiber optical coupler that is cost-effective compared to per-fiber optical coupling arrangements while achieving crosstalk performance that is similar to such per-fiber optical coupling arrangements.

Crosstalk in fiber optic applications can be illustrated by an exemplary arrangement of four fiers F1-F4, each with four wavelengths $\lambda 1$-$\lambda 4$. In this arrangement, there are sixteen channels, i.e., (F1, $\lambda 1$) through (F4, $\lambda 4$). If each of F1-F4 uses a separate optical coupler, however, each channel (e.g., (F1, $\lambda 1$)) is only susceptible to crosstalk from the other channels carried on that same fiber (e.g., (F1, $\lambda 2$), (F1, $\lambda 3$), (F1, $\lambda 4$)). In contrast, if a multi-fiber coupling arrangement without per-fiber separation is used, then each channel of a particular fiber (e.g., (F1, $\lambda 1$)) is susceptible to crosstalk from all other channels on all fibers.

Crosstalk generally requires proximity, however, so in most cases, designers are concerned primarily about crosstalk from channels that are physically adjacent to a particular channel. This crosstalk can occur within the optical coupler. In fact, the coupler's optical properties can cause channels that are physically adjacent when entering the coupler to intermingle within the coupler, thereby causing crosstalk. As can be appreciated from the above example, it can be significantly more difficult to design a multi-fiber coupler that prevents and/or minimizes intermingling and/or crosstalk of 16 channels within the coupler, as compared to a single-fiber coupler that only handles four channels.

Figure 1:
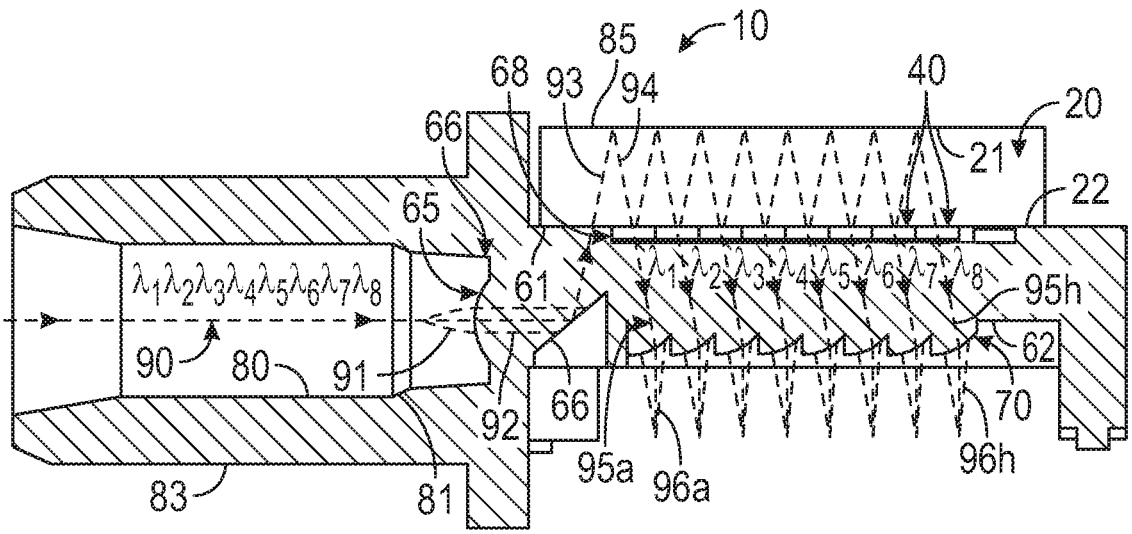
FIG. 1 is a cross-section side view of an exemplary optical coupler used to separate an eight-wavelength (8λ) optical signal into eight individual optical signals, according to one or more exemplary embodiments of the present disclosure.

FIG. 1 is a cross-section side view of an exemplary optical coupler 10 used to separate a multi-wavelength optical signal into eight individual optical signals. FIG. 1 shows the assembled primary components and illustrates the optical pathway 90-96 wherein an incoming signal includes eight separate wavelengths, $\lambda 1$-$\lambda 8$, that are separated into eight separate channels to be read by photodetectors (not shown). An optical arrangement 20 that can be formed of glass or molded of plastic (e.g., as an optical block) is shown with a plurality of filters 40 attached to its lower surface 22. The optical arrangement 20 has an upper flat surface 21 which is coated with a reflective material 85. Optical coupler 10 includes molded body portion 83 having a flat upper surface 61 that can be connected and/or adhesively attached to the flat lower surface 22 of optical arrangement 20. In the exemplary embodiment illustrated in FIG. 1, optical coupler 10 (e.g., the molded body portion 83) includes a fiber optic cable receptacle 80 integrally molded therein for receiving the end of a fiber optic cable (not shown) so that the end of the cable engages receptacle seat 81.

As further illustrated in FIG. 1, a multiplexed optical beam moves along optical pathway 90, exits the end of the fiber optic cable (not shown) and begins to diverge as shown at 91. A lens 65 collimates the diverging light beam 91 and forms a collimated beam 92. In some exemplary embodiments, a lens receptacle 66 can be integrally formed in optical coupler 10, into which lens 65 can be inserted, attached, and/or mounted. In other exemplary embodiments, lens 65 can be integrally formed in optical coupler 10, e.g., in an area corresponding to lens receptacle 66. After passing through lens 65, collimated light beam 92 is reflected off reflector 66 (also known, e.g., as a "total internal reflector") of optical coupler 10 and is directed upwardly toward the reflective coating 85 carried by the flat upper surface 21 of the optical arrangement 20. In some exemplary embodiments, reflector 66 can be integrally formed in optical coupler 10, e.g., as part of lower surface 62. In other exemplary embodiments, reflector 66 can be attached or mounted to an internal surface of optical coupler 10. As the light beam moves through that section 93 of the optical pathway, it impinges against the reflective coating 85 at a predetermined angle of incidence as known in the art. The reflected beam 94 is reflected in a zigzag pattern in optical arrangement 20 between the plurality of n filters 40 and the reflective surface 85 as is known in the art.

As the reflected beam enters each of the filters, one of the different wavelengths of light is transmitted through each filter and the separated wavelengths propagate along the optical pathways 95a-h toward a plurality of aspheric surfaces 70 (also referred to herein as "lenses") that can be formed on the lower surface 62 of optical coupler 10. In other exemplary embodiments, the lenses 70 can be attached or mounted to lower surface 62. In some exemplary embodiments, each of the aspheric surfaces or lenses 70 can focus a particular wavelength, wavelength band, and/or channel of the group 96a-h onto a particular photodetector (not shown) positioned below that lens. In other exemplary embodiments, lenses 70 can be configured to be non-collimating or expanding with respect to the optical signals 96a-h received via filters 40.

In other exemplary embodiments, where optical coupler 10 is used to combine or multiplex various wavelengths of light 96a-h generated by light sources (not shown) similarly positioned below lenses 70, the aspheric surfaces or lenses can be configured to focus the light 96a-h generated by the respective light sources into respective center regions of filters 40. In other exemplary embodiments, the aspheric surfaces or lenses can be configured to collimate the light 96a-h generated by the respective light sources into parallel beams incident on filters 40.

Figure 2:
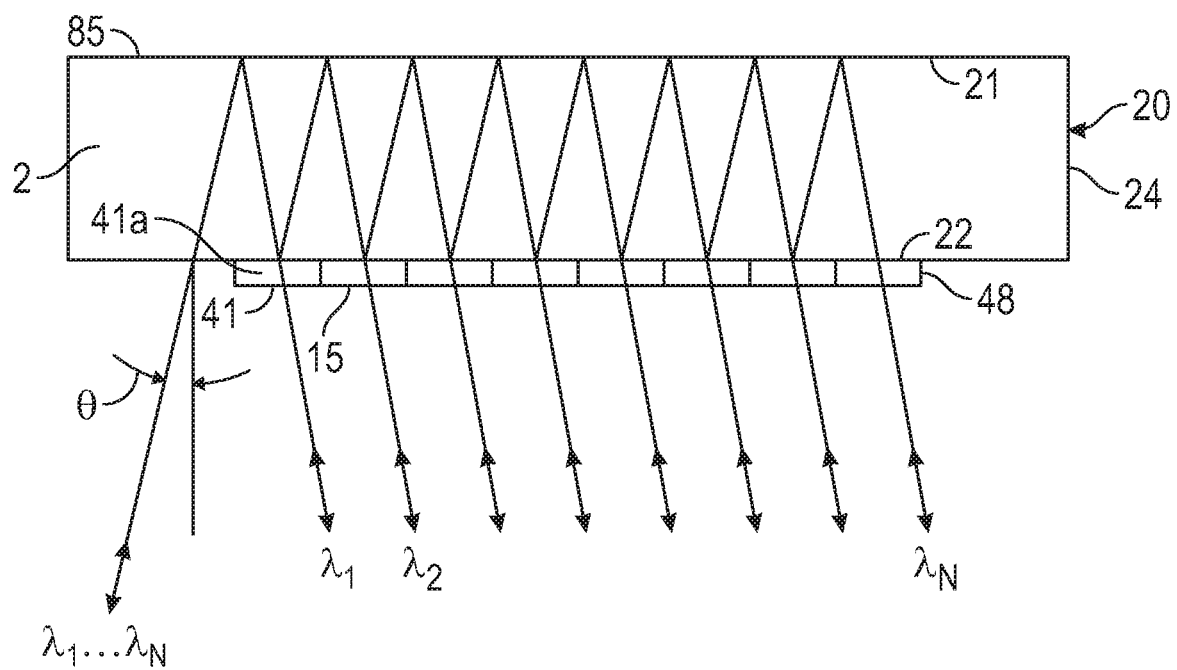
FIG. 2 is a cross-sectional side view of an exemplary optical arrangement (e.g., an optical block) comprising the exemplary optical couple shown in FIG. 1.

As shown in FIG. 2, optical arrangement 20 can be generally rectangular cubic in shape having flat upper and lower surfaces 21 and 22, a flat proximal end wall 23, and a flat distal wall 24. Optical arrangement 20 can be formed of any transparent optical material capable of transmitting light over the desired spectral region and being formed or polished to the correct thickness. For example, optical arrangement 20 can be formed from a high quality optical glass. Alternately, the optical arrangement 20 can be injection molded using high quality optical plastic. The reflective coating 85 can be applied to upper surface 21 of optical arrangement 20.

The reflective coating can be formed of materials including, e.g., dielectric interference coatings or metallic coatings. The reflective surface 85 can be placed on the optical block by a number of techniques including, e.g., dielectric interference coatings, metallic coatings, etc.

A plurality (e.g., an array) of discrete multiwavelength Fabry-Perot transmission filters can be mounted on lower or bottom surface 22 opposite upper surface 21. The plurality of filters can include, e.g., eight discrete Fabry-Perot filters 41-48 mounted adjacent each other on surface 22, as shown best in FIG. 2. Each of the discrete filters 41-48 can be spaced apart slightly from each other as they are adhesively connected to the bottom surface 22 of optical arrangement 20. This method of placing the discrete Fabry-Perot filters adjacent each other on a known flat surface avoids many of the bonding and alignment problems in existing prior art wavelength division multiplexers. Additionally, the proximal end 41a of filter 41 is intended to contact the surface 68 (FIG. 1) of the optical coupler 10 so that the filter assembly will have the proper optical alignment with the aspheric lens array when the device has been assembled. In some embodiments, the small spaces between adjacent filters (e.g., space 151) can be optically transparent. In other exemplary embodiments, explained below, reflective coatings can be applied to surface 22 in the spaces between adjacent filters.

The assembly of the filter array onto the optical block and then the connection and/or adhesive attachment of optical arrangement 20 to optical coupler 10 achieves an optical alignment of the optical elements. When assembled as described above, the output beam 91 of the fiber optic cable can be directly coupled to the optical coupler 10 and aligned with the internal optics of the device, including the collimating lens 65, the beam reflection means, the reflective coating 85 on the top surface of optical arrangement 20 as well as with the plurality of filters 40 and the plurality of aspheric surfaces 70. Preferably, no post-fabrication alignment or tuning or adjustment of these optical elements is required.

Figure 3:
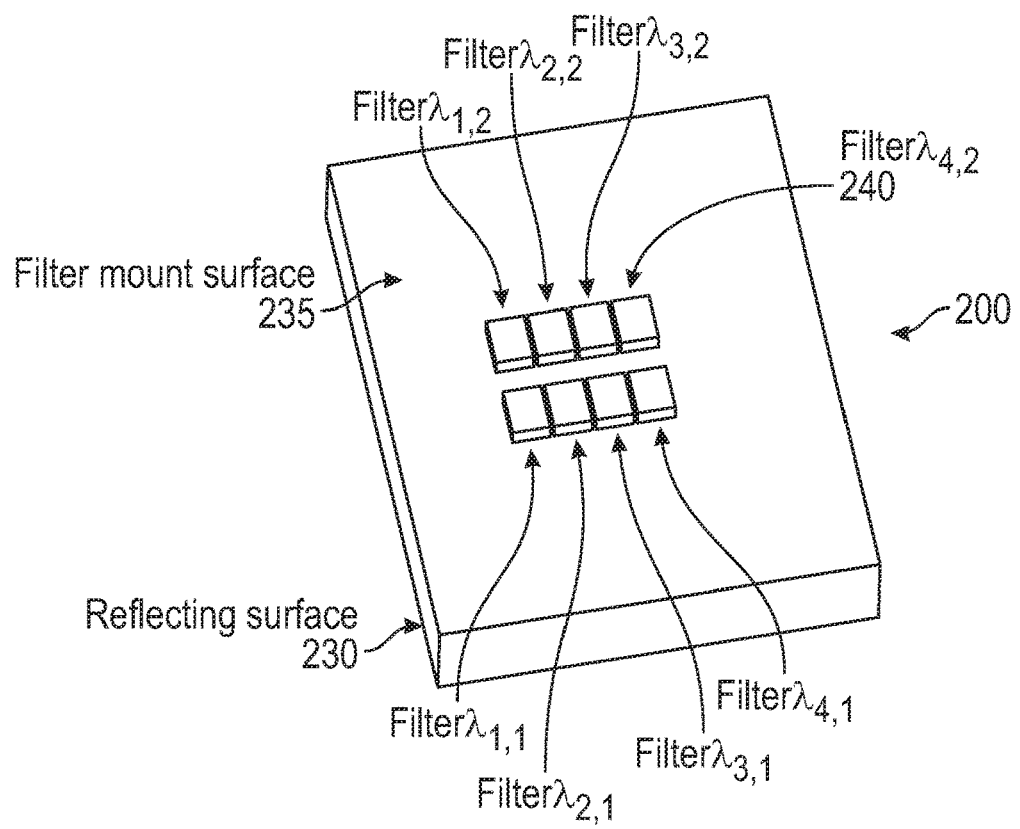
FIG. 3 is an isometric bottom view of an exemplary optical arrangement usable to separate four-wavelength (4λ) optical signals from each of two optical fibers into eight individual optical signals, according to one or more exemplary embodiments of the present disclosure.

FIG. 3 is an isometric bottom view of an exemplary optical arrangement usable to separate four-wavelength (4λ) optical signals from each of two optical fibers into eight individual optical signals, according to one or more exemplary embodiments of the present disclosure. The optical arrangement shown in FIG. 3 can be constructed of similar materials and in a similar manner as optical arrangement 20 shown in FIGS. 1-2. Nevertheless, rather than a single row of eight (8) optical filters, each for a particular wavelength, the filters of the optical arrangement shown in FIG. 3 are arranged in two rows, corresponding to the two optical fibers. Each row comprises four optical filters, each for a particular wavelength carried by the corresponding fiber.

Figure 4:
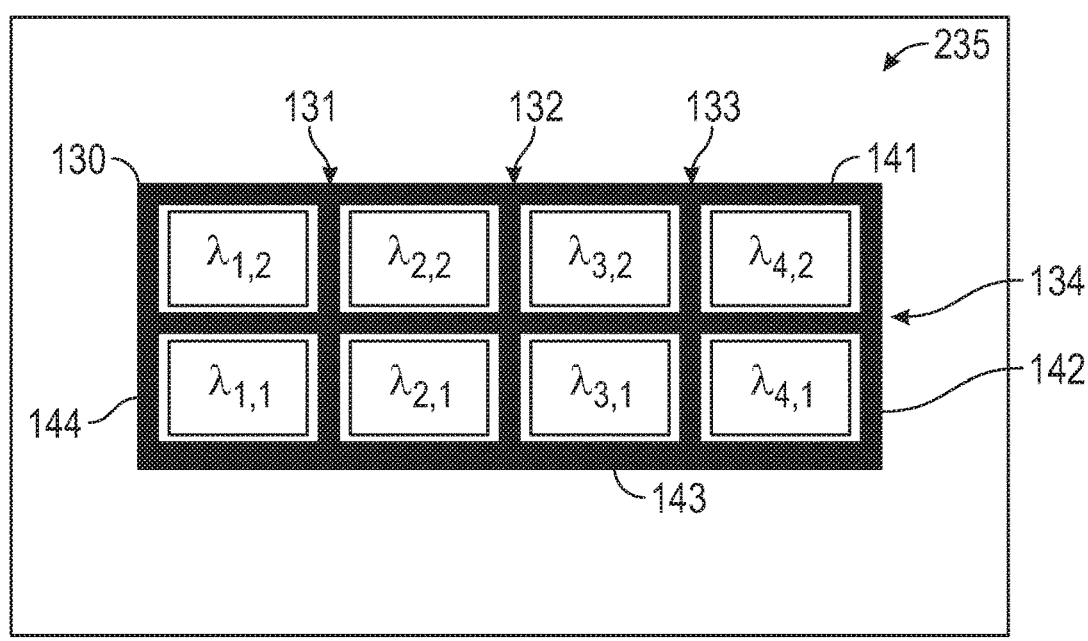
FIG. 4 is bottom view of a particular embodiment of the exemplary optical arrangement shown in FIG. 3.

FIG. 4 is a bottom view of another exemplary embodiment of the optical arrangement shown in FIG. 3. In this exemplary embodiment, a patterned opaque layer 130 is formed on the surface of the optical arrangement used to mount the optical filters. The opaque layer 130 can cover spaces between adjacent filters and, in some embodiments, can also cover the perimeter of the filter array (as shown). In such embodiments, the patterned opaque layer 130 can include transverse lines 131-134 in the spaces between adjacent filters and/or perimeter lines 141-144 which extend around the perimeter of the footprint of the array of filters. In some embodiments, the transverse lines 131-134 can have width slightly larger than the optically transparent regions or gaps between adjacent filters, e.g., sufficiently wide to prevent undesired light from penetrating through the gaps between adjacent filters. The width of perimeter lines 141-144 can be sufficient to reduce optical noise created by the filter edges interacting with portions of diverged light in the optical pathway. The opaque layer 130 can be constructed of different materials (i.e., aluminum, dielectric coating, gold, etc.) and can be applied either through lithography or direct writing. The patterned opaque layer 130 can improve the performance of the optical arrangement by, e.g., reducing crosstalk between light sources passing through adjacent filters.

Figure 5:
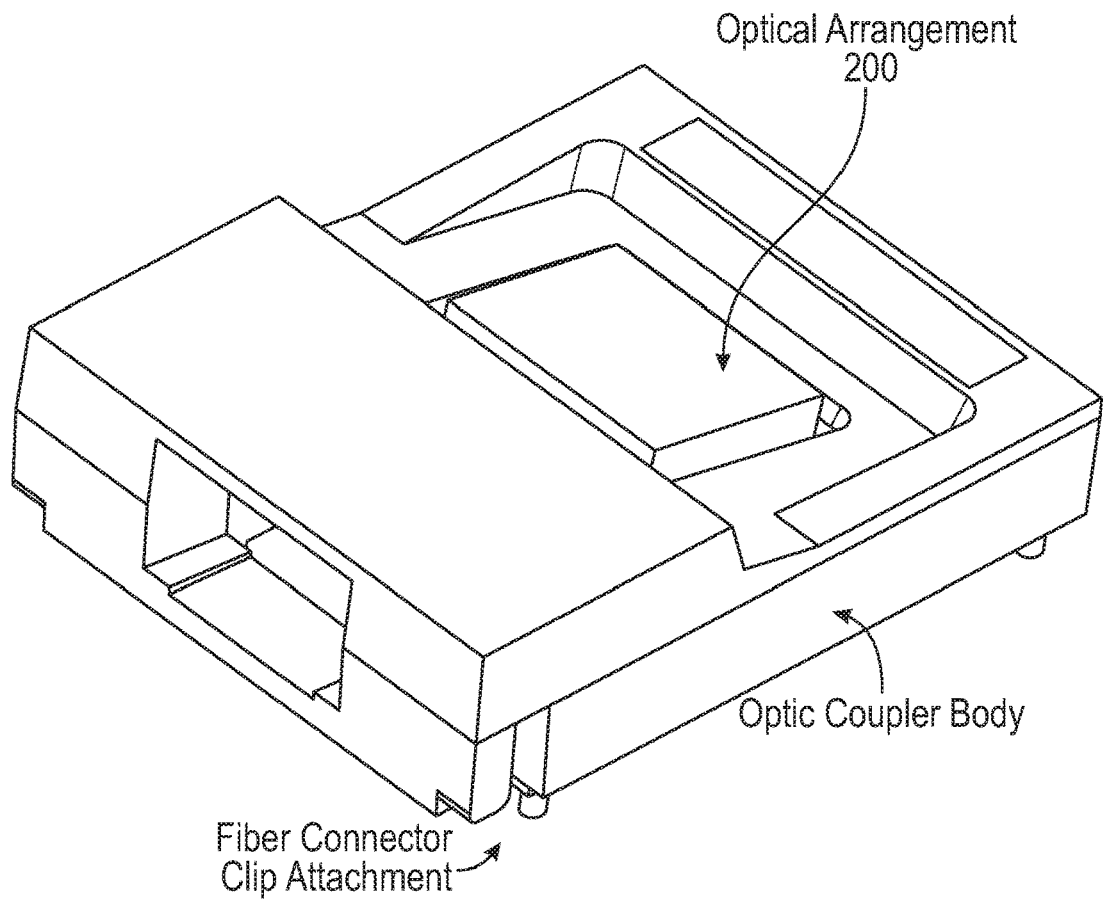
FIG. 5 is an isometric top view of an exemplary two-fiber optical coupler including an external housing and incorporating an optical arrangement such as shown in FIG. 3 or 4, according to one or more exemplary embodiments of the present disclosure.

FIG. 5 is an isometric top view of an exemplary two-fiber optical coupler including an external housing and incorporating an optical arrangement such as shown in FIG. 3 or 4, according to one or more exemplary embodiments of the present disclosure.

Figure 6:
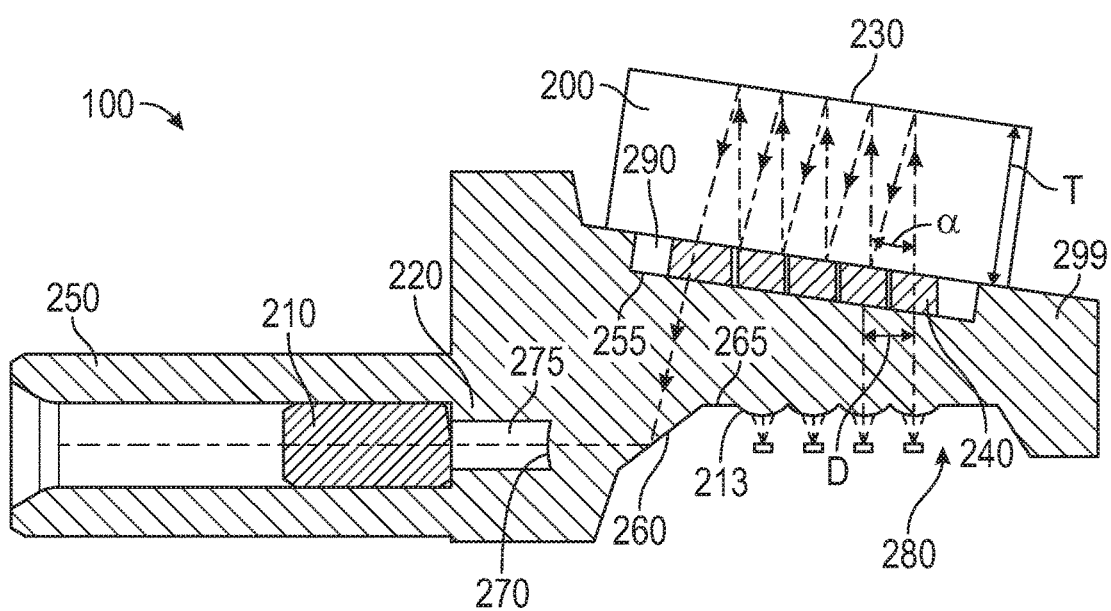
FIG. 6 is a cross-section side view showing an internal portion of the exemplary two-fiber optical coupler illustrated by FIG. 5, according to one or more exemplary embodiments of the present disclosure.

FIG. 6 is a cross-section side view showing an internal portion 100 of the exemplary two-fiber optical coupler illustrated by FIG. 5, according to one or more exemplary embodiments of the present disclosure. FIG. 6 also illustrates the light transmission principle of this exemplary embodiment, where dashed lines with arrows represent light. Note that FIG. 6 illustrates the combination of light having various wavelengths into a single optical signal for transmission through an optical fiber, but skilled persons will readily understand that explanation below applies equally to separating a multi-wavelength optical signal received from the optical fiber.

As shown in FIG. 6, the light of different wavelengths enters the optical arrangement 200 through the multiple filters 240. For instance, each of the different wavelengths can be provided by a corresponding laser 280 via a corresponding lens of lens array 213 that is used to focus and/or direct the provided light toward a particular one of filters 240, as illustrated in FIG. 6. In some exemplary embodiments, second lenses 213 can be aspherical lenses. According to the principles discussed above, each of the different filters 240 can only allow one wavelength (or narrow range of wavelengths) of light to pass through, such that the light of substantially different wavelengths can be multiplexed (or demultiplexed) by using the reflective surface 230 and the filters 240.

In the exemplary embodiment shown in FIG. 6, by forming an angle (A1) between the surface of optical arrangement 200 carrying the filters 240 and the plane of the array of second lenses 213, the lasers 280 can be positioned "on-axis" with respect to the second lenses 213. In some exemplary embodiments, the filters 240 can be configured such that their side surfaces are parallel to each other and perpendicular to the plane of second lenses 213. In such embodiments, light entering the optical arrangement 200 can pass through the center of respective filters 240, e.g., via a path substantially parallel to the side surfaces of the filters. This can improve the optical performance of optical arrangement 200 by reducing path loss for the filters. Such an arrangement can also reduce crosstalk between adjacent light sources, in a manner similar to the patterned opaque layer discussed above in relation to FIG. 4. In other exemplary embodiments, filters 240 can be configured such that their side surfaces are perpendicular to the bottom surface of optical arrangement 200. FIG. 6 also illustrates a cavity 290 between optical arrangement 200 and the body of the optical coupler.

In some exemplary embodiments, the range of the angle A1 between the surface of optical arrangement 200 carrying the filters 240 and the plane of the second lenses 213 can be between 6° and 13°. If the filters are equally spaced with a distance D between vertical centerlines of adjacent filters 240 (also referred to as "lens pitch") and the thickness of optical arrangement 200 is T, the angle of reflection of the light of different wavelengths will be α, as determined by the relationship D'2*tan(α)*T.

The optical coupler can also include a plurality of optical fiber receptacles 250 (e.g., one for each fiber), a total internal reflector (TIR) 260, and an array of first lenses 270 (e.g., one for each fiber). The array of first lenses can be arranged in a lens array receptacle 275 of the body of the optical coupler. When inserted into the receptacle 250, an optical fiber is optically aligned with a corresponding first lens 270 and TIR 260. Furthermore, TIR 260 is optically aligned with the optical arrangement 200, such that TIR 260 can be configured to reflect, between the first lens 270 and the optical arrangement 200, the light to/from the optical fibers.

Figure 9:
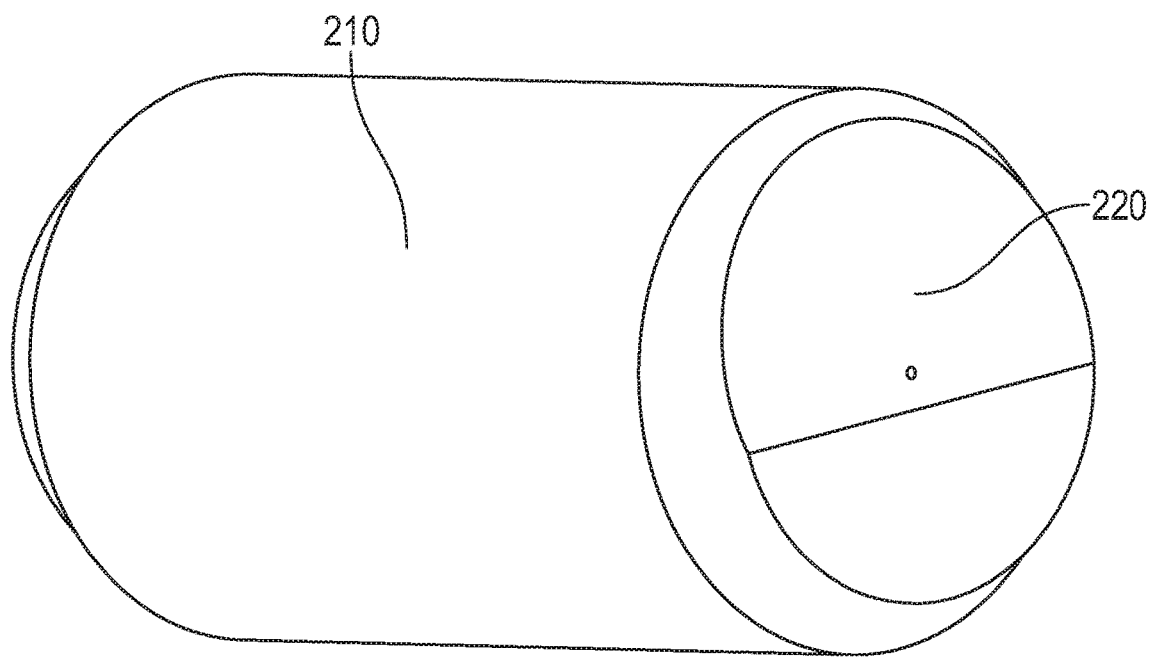
FIG. 9 is an isometric view of a ferrule having an angled or beveled face, according to one or more exemplary embodiments of the present disclosure.

Each receptacle 250 can include therein a ferrule 210 located at an end face of the optical fiber inserted into the receptacle 250. A more detailed view of a ferrule 210 is shown in FIG. 9. Each ferrule 210 can have a substantially cylindrical shape and can include an angled or beveled end 220 that is adjacent to the first lens 270. The bevel 220 can be configured to reflect light passing through the first lens 270 and incident to the ferrule 210 towards a direction deviating from a major axis of the first lens 270, so as to mitigate and/or reduce light reflected by the ferrule 210 from returning to the first lens 270 along the originating path. As such, the bevel 220 can also reduce light returning to lasers 280 via the optical arrangement 200.

Figure 7:
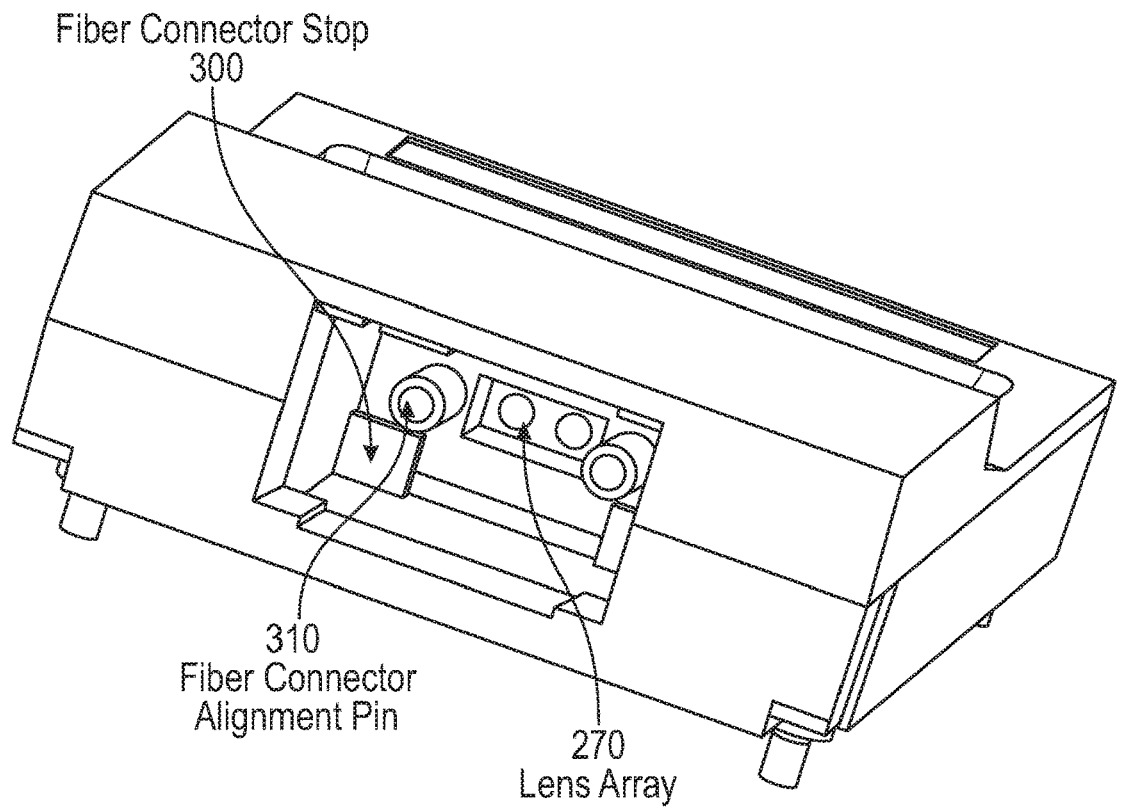
FIG. 7 is is an isometric front view of an exemplary two-fiber optical coupler including an external housing and incorporating an optical arrangement such as shown in FIG. 3 or 4, according to one or more exemplary embodiments of the present disclosure.

FIG. 7 is an isometric front view of an exemplary two-fiber optical coupler including an external housing and incorporating an optical arrangement such as shown in FIG. 3 or 4, according to one or more exemplary embodiments of the present disclosure. FIG. 7 illustrates the configuration and/or positioning of the receptacle 250 and first lens array 270 discussed above. FIG. 7 also illustrates features that can facilitate connecting the two optical fibers to the coupler, including a fiber connector stop 300 and a fiber connector alignment pin 310.

Figure 8:
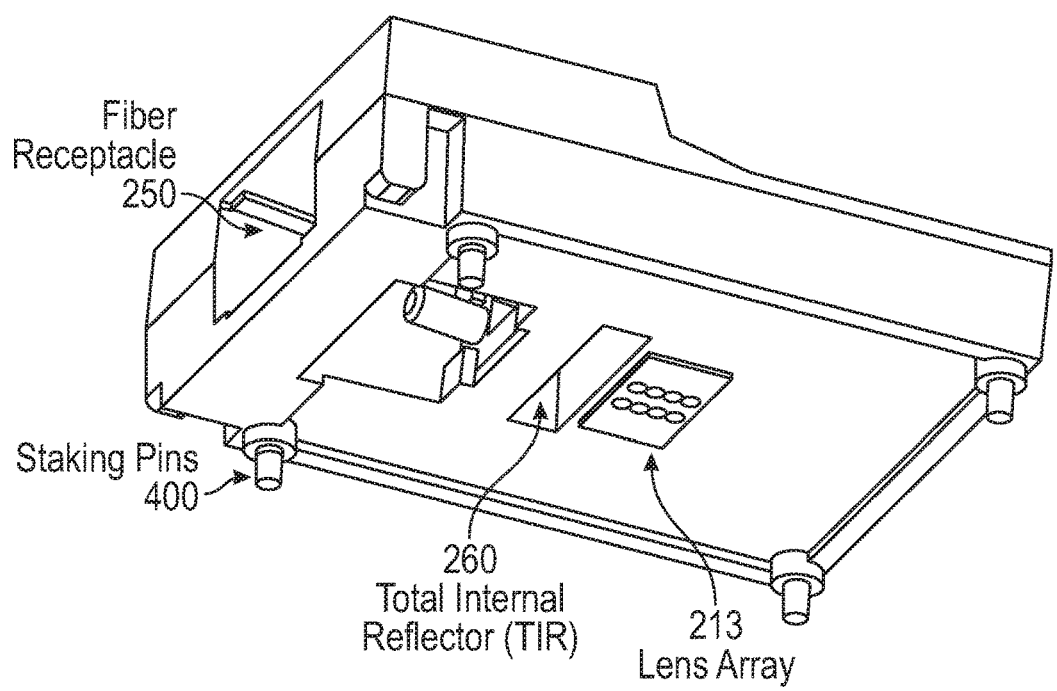
FIG. 8 is an isometric bottom view of an exemplary two-fiber optical coupler including an external housing and incorporating an optical arrangement such as shown in FIG. 3 or 4, according to one or more exemplary embodiments of the present disclosure.

FIG. 8 is an isometric bottom view of an exemplary two-fiber optical coupler including an external housing and incorporating an optical arrangement such as shown in FIG. 3 or 4, according to one or more exemplary embodiments of the present disclosure. FIG. 8 illustrates the configuration and/or positioning of the receptacle 250, total internal reflector (TIR) 260, and second lens array 213 discussed above. FIG. 8 also illustrates features that can facilitate connecting the optical coupler to a substrate or circuit board, including a plurality of (e.g., four) staking pins 400.

Figure 10:
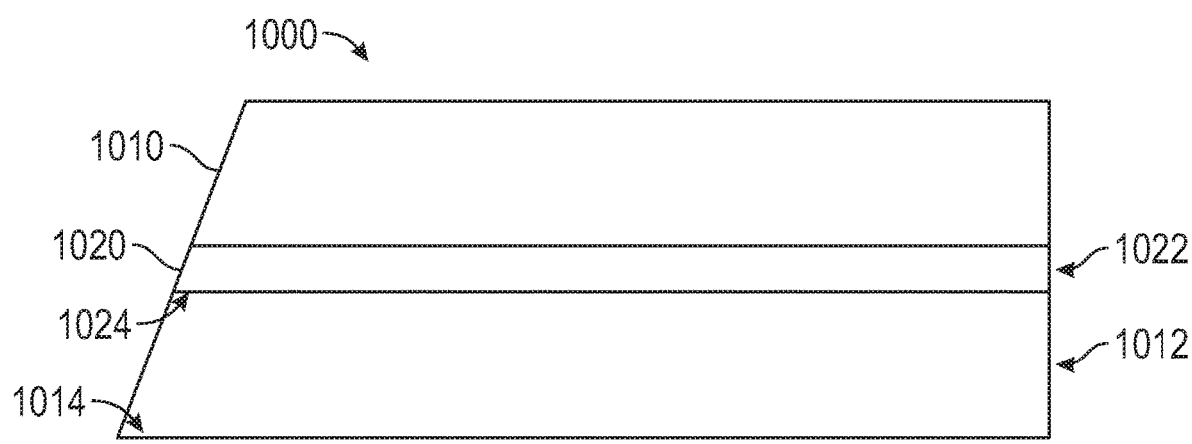
FIG. 10 is a cross-section view of an optical coupler incorporating an angled ferrule and angled fiber stub, according to one or more exemplary embodiments of the present disclosure.

FIG. 10 is a cross-section view of another reflection-reduction mechanism usable with one or more exemplary embodiments of the present disclosure. In particular, FIG. 10 shows an assembly 1000 comprising an optical fiber stub 1020 having a first face 1022 with an angle substantially equal to 90 degrees with respect to the longitudinal axis of the stub 1020, and a second face 1024 with an angle of less than 90 degrees with respect to the longitudinal axis of the stub 1020. The assembly also comprises ferrule 1010 surrounding the optical stub 1020 and having a first face 1012 and second face 1014 having angles substantially equal to the angles of faces 1022 and 1024, respectively. In some embodiments, the angles of second faces 1014 and 1024 can be between 82 and 86 degrees relative to the longitudinal axis. In this manner, fiber stub 1020 can be configured for compatibility (e.g., to "mate") with fibers having faces polished to a similar angle, such as less than or equal to 85 degrees relative to the fiber longitudinal axis. The assembly can be inserted into a receptacle of an optical coupler, such as receptacle 250 shown in FIG. 6, such that faces 1012 and 1022 are proximate to filters 240.

In other exemplary embodiments, reflections back into the optical fibers can be reduced by mounting, attaching, affixing, and/or inserting an optical block (also referred to as an "optical insert") within each of the fiber receptacles comprising the multi-channel optical coupler. The optical block can be fabricated from a material, such as fused silica, having an index of refraction substantially matching the optical fiber's index of refraction. Various embodiments of optical blocks, as well as techniques for inserting and retaining the optical blocks within the fiber receptacles, are described in application PCT/US2019/xxxxxx (docket number 1072-0006), entitled "Fiber Optical Interface with Reduced Reflections," filed concurrently herewith and incorporated by reference herein in its entirety.

Figure 11A:
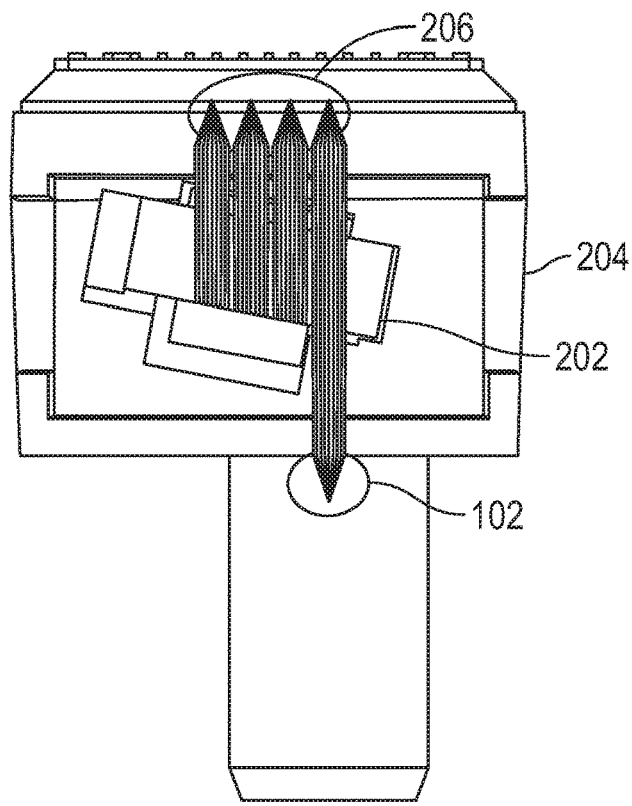
FIGS. 11A-B, shows two views of an exemplary optical coupler including an optical arrangement mounted in an alternate configuration, according to one or more exemplary embodiments of the present disclosure.
Figure 11B:
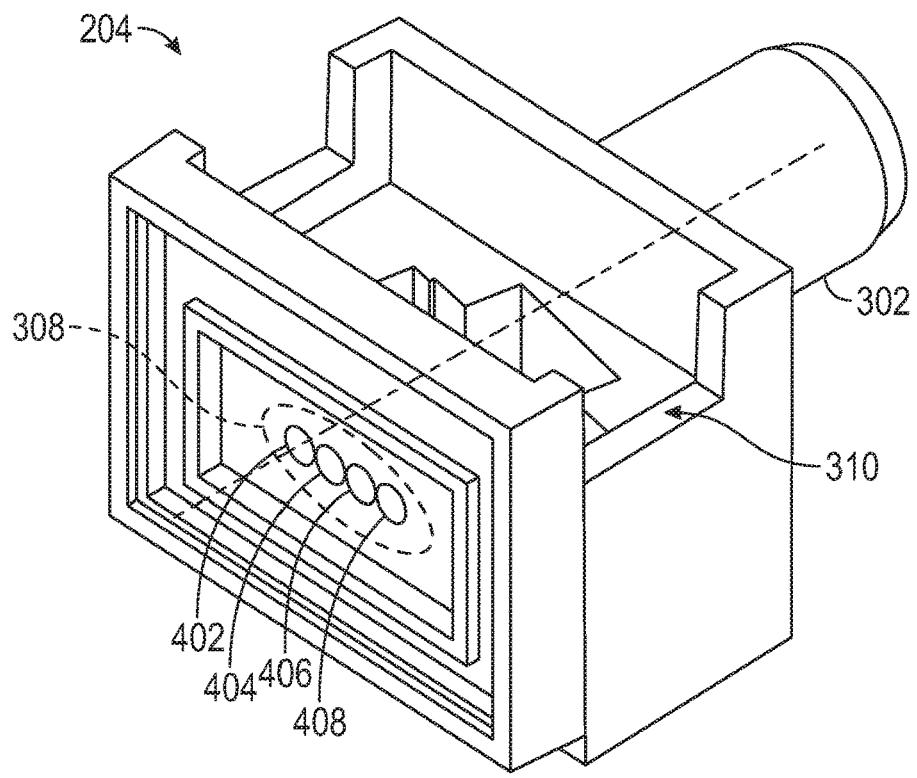

FIGS. 11A and 11B are two views of an exemplary optical coupler including an optical arrangement mounted in an alternate configuration, according to one or more exemplary embodiments of the present disclosure. In particular, FIG. 11A is a cross-section view of an exemplary embodiment without a total internal reflector (TIR), such as TIR 260 discussed above. The optical coupler shown in FIG. 11A can comprise a molded body 204 surrounding an optical arrangement 202, which in some embodiments can be substantially similar to various optical arrangements described above in relation to other figures. For example, optical arrangement 202 can split, or demultiplex, incoming optical signal 102 into four constituent wavelengths 206 according to the principles described above. In some exemplary embodiments, molded body 204 can be fabricated by a single-shot molding process, such that the elements of body 204 or optical arrangement 202 are contained in the two opposing sides of the mold, thus providing substantial alignment between the elements.

FIG. 11B is an isometric view of molded body 204 showing arrangement of various components. Molded body 204 includes a cavity 310 for insertion of optical arrangement 202, such that at least one surface of optical arrangement 202 is in contact with at least one surface of cavity 310. Molded body 204 also includes a receptacle 302 for an optical fiber, configured such the end of the optical fiber will be in optical alignment with a first optical filter of the optical arrangement 202. Although only one receptacle 302 is shown, skilled persons will readily comprehend that body 204 can be molded with a plurality of fiber receptacles 302 and a cavity 310 of a size that accommodates an optical arrangement 202 suitable for multiple optical fibers, such as the optical arrangement shown in FIG. 3 described above. The one or more receptacles 302 can be molded, in some exemplary embodiments, to included integral lenses through which optical signals from the respective one or more fibers can pass. Alternately, body 204 can be molded to facilitate insertion of an appropriate lens in each of receptacles 302.

An array 308 of four lenses 402-408 can be optically aligned with the four optical signals 206 provided by the respective filters of optical arrangement 202, as shown in FIG. 11A. In some exemplary embodiments, the lens array 308 can be integrally molded with body 204, while in other exemplary embodiments, the lens array 308 can be separately formed and inserted into a corresponding receptacle formed in body 204. In some exemplary embodiments, body 204 can be formed with a number of receptacles, one for each of lenses 402-408. In embodiments where body 204 is molded with a plurality of fiber receptacles 302, body 204 can be molded with—or to accommodate—a lens array 308 suitable for the single-wavelength signals demultiplexed from the multi-wavelength signals carried by the respective fibers.

Figure 12:
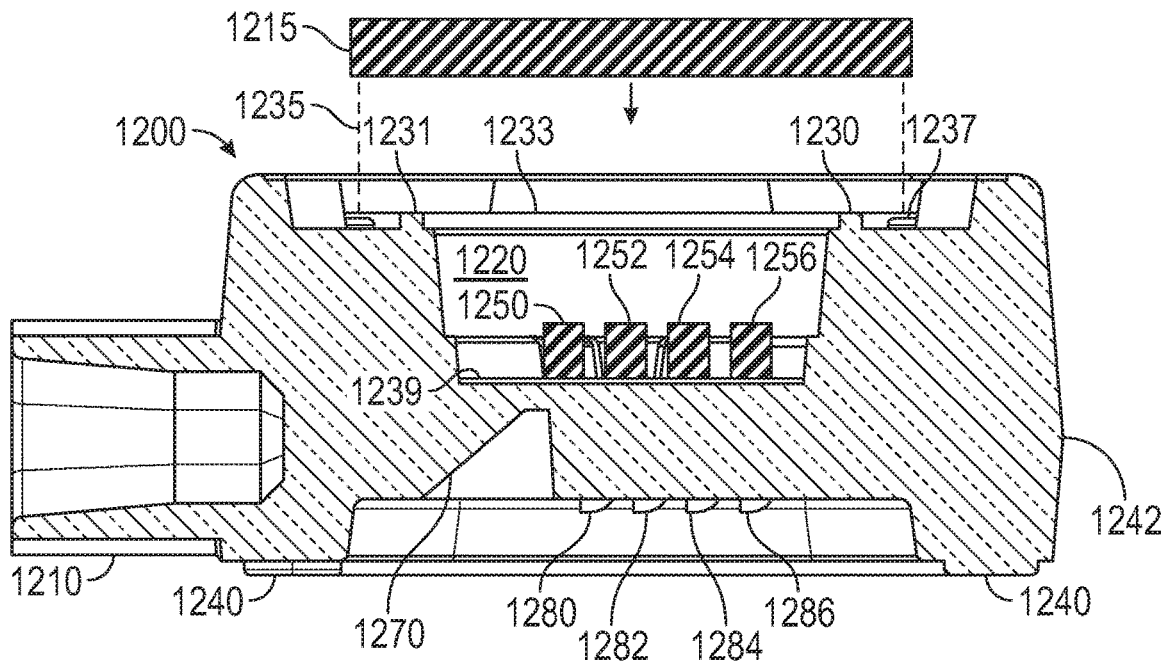
FIG. 12 is a cross-section side view of an optical coupler assembly incorporating an optical arrangement comprising a cavity, according to one or more exemplary embodiments of the present disclosure.

FIG. 12 is a cross-section side view of an optical coupler assembly incorporating an optical arrangement comprising a cavity, according to one or more exemplary embodiments of the present disclosure. In particular, FIG. 12 illustrates an optical coupler 1200 with a fiber receptacle 1210 at the forward end of a molded body (or coupling module) 1242. A total internal reflector (TIR) 1270 can be formed, arranged, or attached with optical coupler 1200 such that it is optically aligned with a fiber inserted into receptacle 1210. In addition, the top or upper side of optical coupler 1200 has a cavity 1220 comprising a mirror mounting surface defined by four flat ridges 1230-1233. Ridges 1230 and 1231 can be parallel to each other and perpendicular to ridges 121 and 1233, which can be parallel to each other and aligned such that only one is visible in this view. Each of ridges 1230 and 1231 intersects both of ridges 121 and 1233, and each of ridges 121 and 1233 intersects both of ridges 1230 and 1231. The mirror mounting surface can be referred to as "substantially" planar because together the flat surfaces or tops of ridges 1230-1233 define a plane.

A planar mirror 1215 can be mounted on the mirror mounting surface. Planar mirror 1215 can comprise, for example, an optical block with a reflective coating similar to embodiments described above. Also within recessed region 1220 is a mirror attachment surface defined by four flat ridges 1234-1237. Ridges 1234-1237 can be recessed below ridges 1230-1233, such that only ridges 1235 and 1237 are visible in this view. Mirror 1215 can be placed on the above-described mirror mounting surface defined by ridges 1230-1233. That is, when mirror 1215 is mounted in this manner, it rests upon or is in contact with ridges 1230-1233. To aid retention of mirror 1215, a coating of adhesive can be applied to the mirror attachment surface before placing mirror 1215 on the mirror mounting surface.

Also within cavity 1220 is a filter mounting surface defined by two flat ridges 1238 and 1239 that are oriented parallel to each other in a longitudinal (e.g., forward-rearward) direction of optics body 1200, such that only 1239 is visible in this view. The filter mounting surface can be referred to as "substantially" planar because together the flat surfaces or tops of ridges 1238 and 1239 define a plane. Also within cavity 1220 is a filter attachment surface comprising four pairs of flat platforms (not visible in this view) that are recessed below ridges 1238 and 1239, such that the filter attachment surface is recessed below the filter mounting surface. Four optical filters 1250-1256—each corresponding to a particular wavelength of light carried by a fiber—can be placed in four corresponding mounts of the filter mounting surface within cavity 1220. To aid retention of filters 1250-1256, a coating of adhesive can be applied to the filter attachment surface before placing the filters on the filter mounting surface. Note that although a single four-filter mounting arrangement is shown, this is merely for illustration and the skilled person will readily comprehend that such an arrangement can include additional filters (corresponding, e.g., to additional wavelengths) and/or can be replicated for each optical fiber coupled to the multi-channel optical coupler. Four lenses 1280-1286—each corresponding to a particular wavelength—are disposed on a lower surface of optical coupler 1200, such that each of lenses 1280-1286 is in optical alignment with one of filters 1250-1256.

Figure 13:
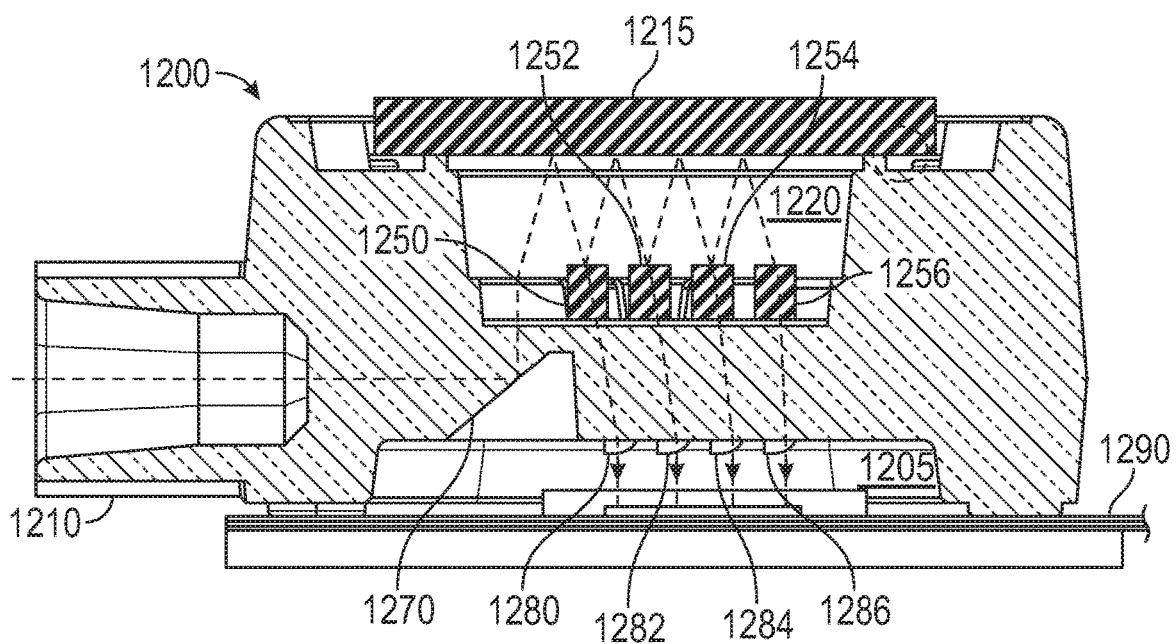
FIG. 13 is a cross-section side view showing the operating principles of an assembled optical coupler corresponding to FIG. 12, according to one or more exemplary embodiments of the present disclosure.

FIG. 13 is a cross-section side view showing the operating principles of a wavelength-division demultiplexer comprising an optical coupler assembly corresponding to FIG. 12, according to one or more exemplary embodiments of the present disclosure. In the exemplary configuration shown in FIG. 13, received optical signals propagate through the assembly comprising optics body 1200, mirror 1215 and filters 1250-1256 along an optical path indicated in broken line. The optical signals comprise four different modulated wavelengths λ1-λ4. Reflective surface 1270 reflects the optical signals onto mirror 1215. Mirror 1215 first reflects the optical signals onto filter 1250, which is transparent to wavelength λ1 and reflective to wavelengths λ2-λ4. Thus, the portion of the optical signal comprising wavelength λ1 passes through filter 1250 and impinges on a first light detector (not separately shown) of an opto-electronic detector chip 1205. Detector chip 1205 can comprise multiple PIN diodes, each sensitive to one of wavelengths λ1-λ4. Detector chip 1205 can be mounted on a surface of printed circuit board assembly 1290 (also commonly referred to as a "substrate"). The remaining portion of the optical signal comprising wavelengths λ2-λ4 are reflected by filter 1250 and impinge on mirror 1215. Mirror 1215 reflects that remaining portion of the optical signals onto filter 1252, which is transparent to the single wavelength λ2 and reflective to at least λ3 and λ4. Thus, the portion of the optical signal comprising wavelength λ2 passes through filter 1252 and impinges on a second light detector (not separately shown), such as a PIN diode, of detector chip 1205. The optical circuits corresponding to the other wavelengths operate in a similar manner.

Skilled persons will readily comprehend that a wavelength-division multiplexer can be constructed in a similar manner as shown in FIG. 13 by replacing the detector chip 1205 with a corresponding multi-wavelength light source comprising, e.g., a plurality of lasers each emitting light having a particular wavelength (or small band of wavelengths). In such embodiments, the direction of light propagation through the optical coupler will be reversed as compared to the direction shown in FIG. 13. Skilled persons will also readily comprehend that a wavelength-division multiplexer/demultiplexer (e.g., transceiver) can be constructed in a similar manner as shown in FIG. 13 by including, with the detector chip 1205, a multi-wavelength light source 1206 comprising, e.g., a plurality of lasers each emitting light having a particular wavelength (or small band of wavelengths). Such combination of detector chip 1205 and light sources 1206 can be mounted on a substrate as described herein below.

The surfaces of mirror 1215 and filters 1250-1256 can be made parallel to each other to a relatively high degree of precision, because the mirror mounting surface and the filter mounting surface can be made parallel to one another to a relatively high degree of precision within the optical coupler. As mentioned above, each lens 1280-1286 can be optically aligned with a corresponding one of the filters 1250-1256, as well as with a corresponding PIN diode of detector chip 1205. Due to the parallel arrangement of planar mirror 1215 and filters 1250-1256, the respective PIN diodes can be positioned "off-axis" with respect to lenses 1280-1286. In some exemplary embodiments, lenses 1280-1286 can be aspherical.

Figure 14:
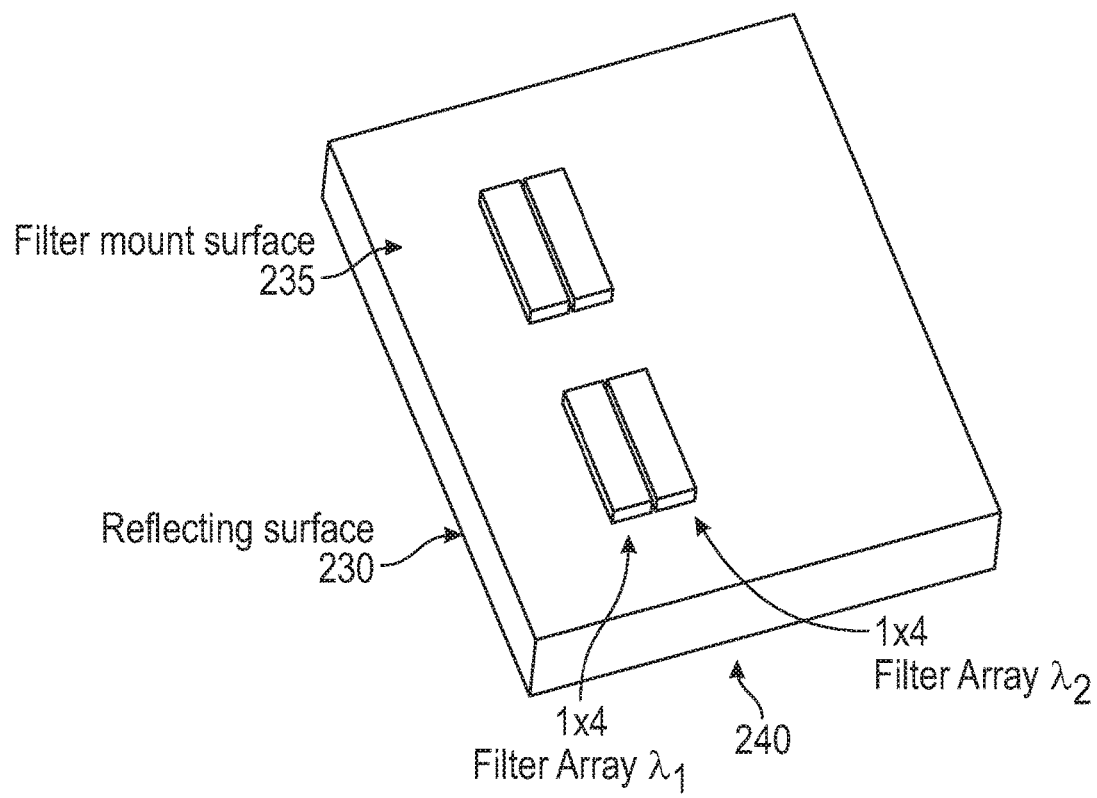
FIG. 14 is an isometric top view of an exemplary optical arrangement usable to separate two-wavelength (2λ) optical signals from each of eight (8) optical fibers into 16 individual optical signals, according to one or more exemplary embodiments of the present disclosure.

FIG. 14 is an isometric top view of another exemplary optical arrangement usable to separate two-wavelength (2λ) optical signals from each of eight (8) optical fibers into 16 individual optical signals, according to one or more exemplary embodiments of the present disclosure. The optical arrangement shown in FIG. 14 can be constructed of similar materials and in a similar manner as optical arrangement 20 shown in FIGS. 1-2 or optical arrangement 200 shown in FIGS. 3-8. Nevertheless, rather than a single row of eight (8) optical filters, each for a particular wavelength, the filters of the optical arrangement shown in FIG. 3 are arranged in eight rows, corresponding to the eight optical fibers. Each row comprises two optical filters, each for a particular wavelength carried by the corresponding fiber.

Figure 15:
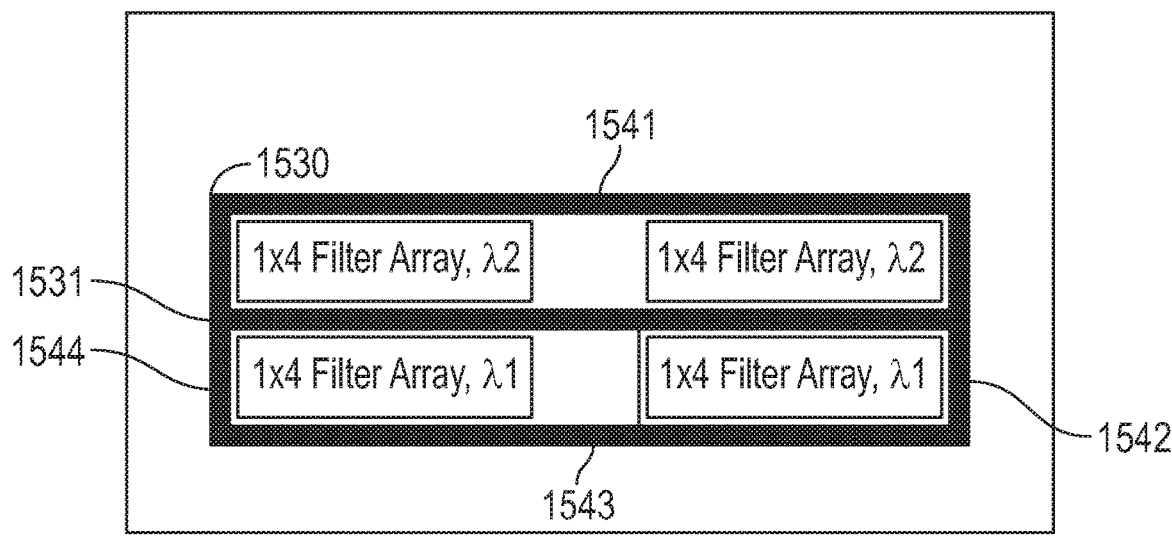
FIG. 15 is a top view of a particular embodiment of the exemplary optical arrangement shown in FIG. 14.

FIG. 15 is a top view of a particular exemplary embodiment of the optical arrangement shown in FIG. 14. In this exemplary embodiment, a patterned opaque layer 1530 is formed on the surface of the optical arrangement used to mount the optical filters. The opaque layer 1530 can covers spaces between adjacent filters and, in some embodiments, can also cover the perimeter of the filter array (as shown). In such embodiments, the patterned opaque layer 1530 can include transverse line 1531 in the spaces between adjacent filter arrays and/or perimeter lines 1541-1544 that extend around the perimeter of the filter arrays. In some embodiments, transverse line 1531 can have width slightly larger than the optically transparent regions or gaps between adjacent filter arrays, e.g., sufficiently wide to prevent undesired light from penetrating through the gaps between adjacent filter arrays. The width of perimeter lines 1541-1544 can be sufficient to reduce optical noise created by the filter edges interacting with portions of diverged light in the optical pathway. The opaque layer 1530 can be constructed of different materials (e.g., aluminum, dielectric coating, gold, etc.) and can be applied either through lithography or direct writing. The patterned opaque layer 1530 can improve the performance of the optical arrangement by, e.g., reducing crosstalk between light sources passing through adjacent filters.

Figure 16:
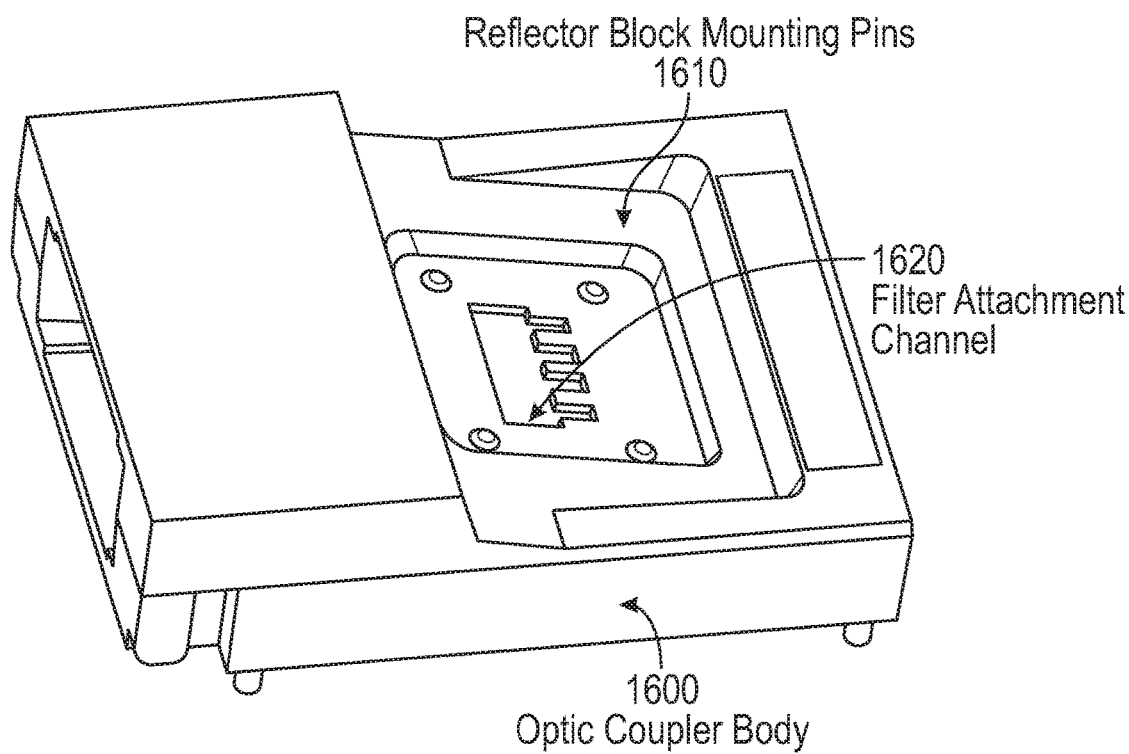
FIG. 16 is an isometric top view of an exemplary optical coupler assembly usable with various optical arrangements, including embodiments corresponding to FIGS. 14 and 15.
Figure 17:
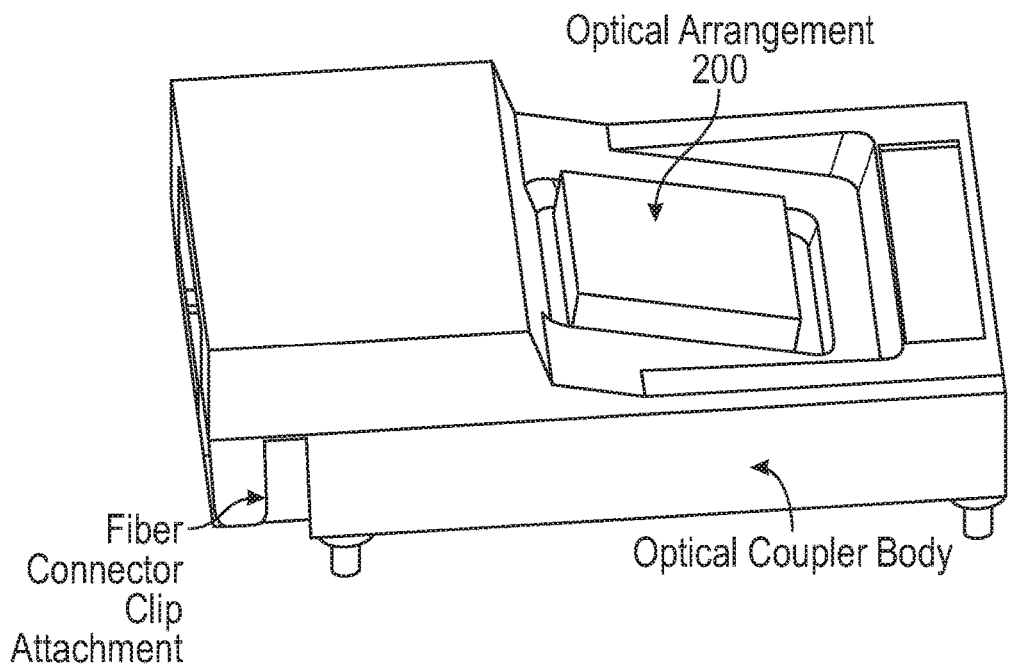
FIG. 17 is an isometric top view of an exemplary optical coupler assembly incorporating an optical arrangement such as exemplary embodiments corresponding to FIGS. 14 and 15.

FIG. 16 is an isometric top view of an exemplary optical coupler assembly, with external housing or body 1600, usable with various optical arrangements including embodiments corresponding to FIGS. 14 and 15. FIG. 16 also illustrates a plurality of mounting pins 1610 and a filter attachment channel 1620 that facilitate mounting of an optical arrangement on a top surface of the optical coupler. FIG. 17 is an isometric top view of an exemplary optical coupler assembly incorporating an optical arrangement in this manner.

Figure 18:
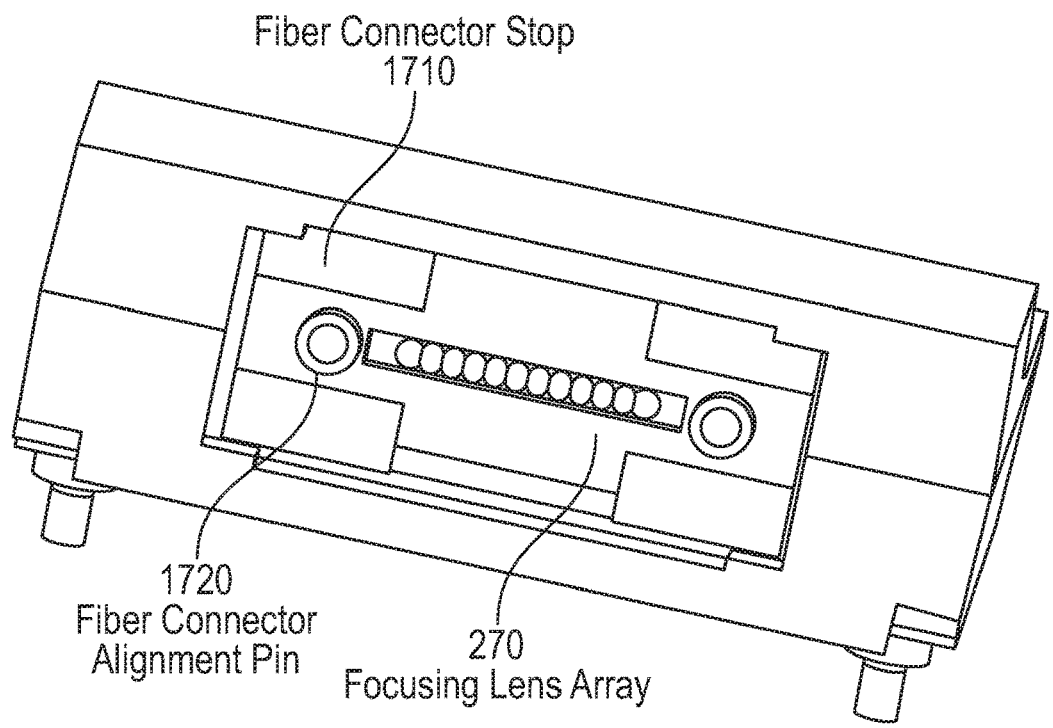
FIG. 18 is an isometric front view of an exemplary optical coupler for twelve (12) optical fibers, according to one or more exemplary embodiments of the present disclosure.

FIG. 18 is an isometric front view of an exemplary optical coupler for twelve (12) optical fibers, according to one or more exemplary embodiments of the present disclosure. FIG. 18 illustrates the configuration and/or positioning of the receptacle 250 and first lens array 270 discussed above. FIG. 18 also illustrates features that can facilitate connecting the two optical fibers to the coupler, including a fiber connector stop 1710 and a fiber connector alignment pin 1720.

Figure 19:
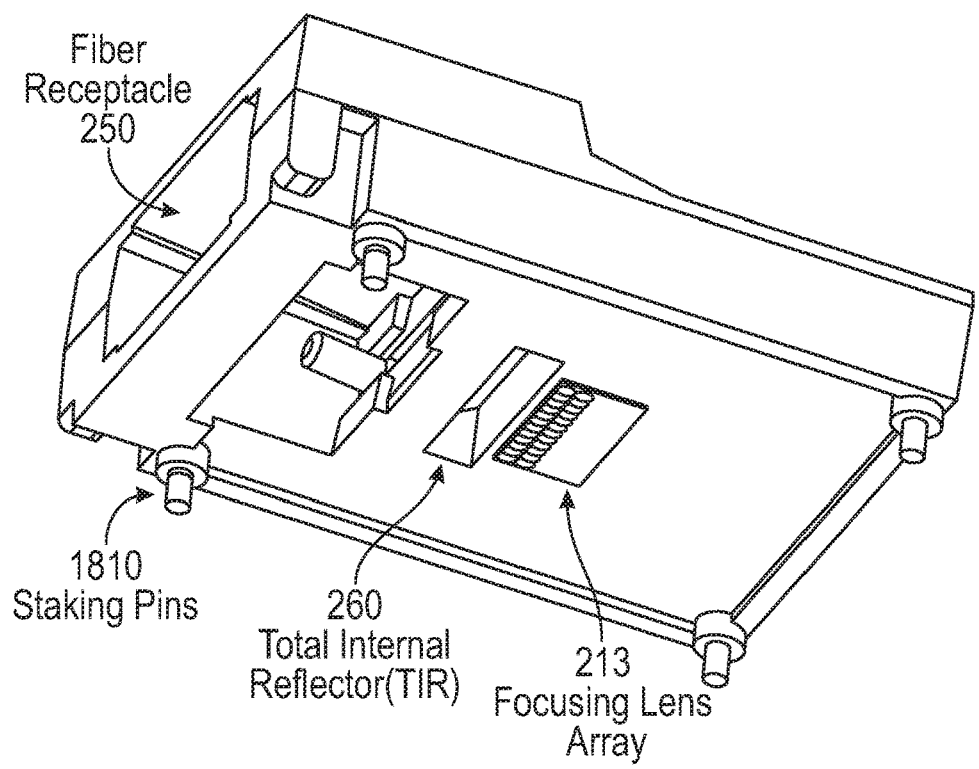
FIG. 19 is an isometric bottom view of an exemplary optical coupler for twelve (12) optical fibers, according to one or more exemplary embodiments of the present disclosure.

FIG. 19 is an isometric bottom view of an exemplary optical coupler for twelve (12) optical fibers, according to one or more exemplary embodiments of the present disclosure. FIG. 19 illustrates the configuration and/or positioning of the receptacle 250, total internal reflector 260, and second lens array 213 discussed above. FIG. 19 also illustrates features that can facilitate connecting the optical coupler to a substrate or circuit board, including a plurality of (e.g., four) staking pins 1810.

Figure 20:
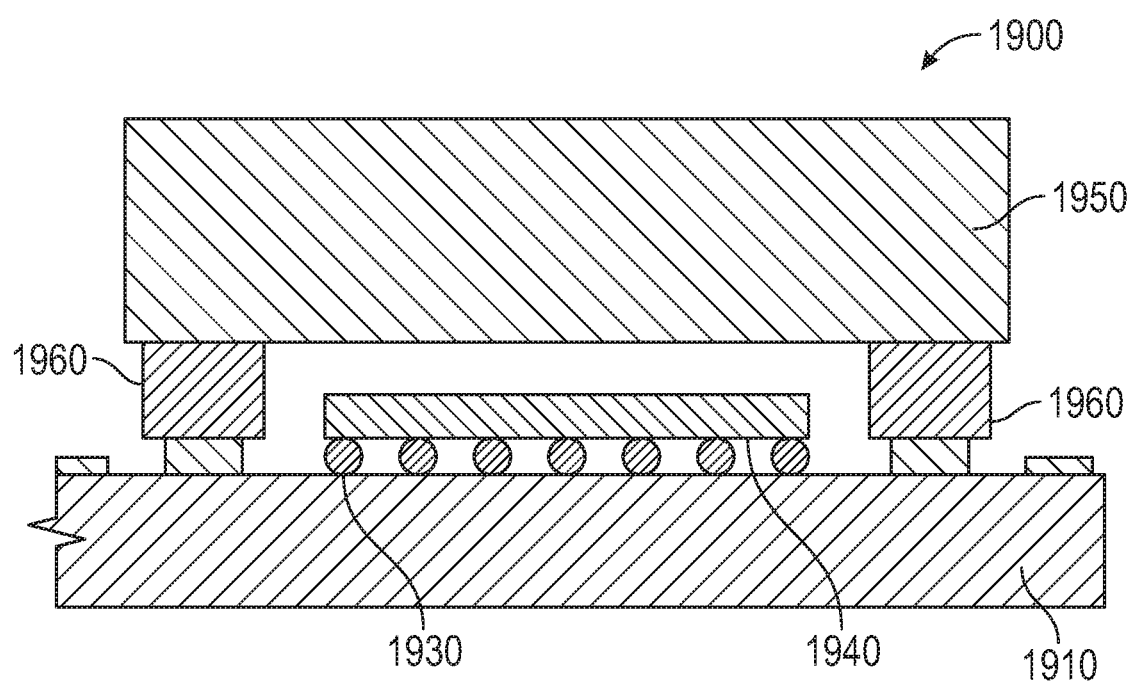
FIG. 20 is a cross-section view of an exemplary optical coupler mounted to a substrate together with other optical conversion electronics, according to one or more exemplary embodiments of the present disclosure.

FIG. 20 is a cross-section view of an exemplary optical coupler mounted to a substrate together with other optical conversion electronics to form a transceiver assembly, according to one or more exemplary embodiments of the present disclosure. Exemplary embodiments shown in FIG. 20 can include a transmitter (Tx), receiver (Rx), or transceiver (Tx/Rx) subassembly that enables a wavelength-division multiplexing and/or demultiplexing solution to be extremely compact and low cost. The side view of FIG. 20 shows only one "slice" (cross-section) of the apparatus, and implementations can include arrays of components, as discussed above. Apparatus 1900 can include a parallel Tx or Rx integrated circuit (IC) 1940, such as known in the persons skilled in the relevant art. IC 1940 includes solder balls 1930 for electrical connection with substrate 1910. IC 1940 can include a plurality of Vertical Cavity Surface Emitting Lasers (VCSELs) (referred to as 1940*a*, for convenience) and/or PIN photodiode arrays (referred to as 1940*b*) on the top surface, e.g., opposite to solder balls 1930. In an Rx circuit, the photodiodes can be implemented with, for example, MSM photodiodes or any other type of photodetector. In a Tx circuit, the optical sources can comprise a laser that can emit light perpendicular to the IC, or an edge-emitting laser with a turning mirror. Other exemplary embodiments can use another electronic sub-mount such as a piece of silicon, Gallium arsenide, or Indium phosphide with electrical traces. Optical coupler 1950 can be positioned over IC 1940 and held in place by a spacer 1960 positioned between coupler 1950 and IC 1940.

Figure 21:
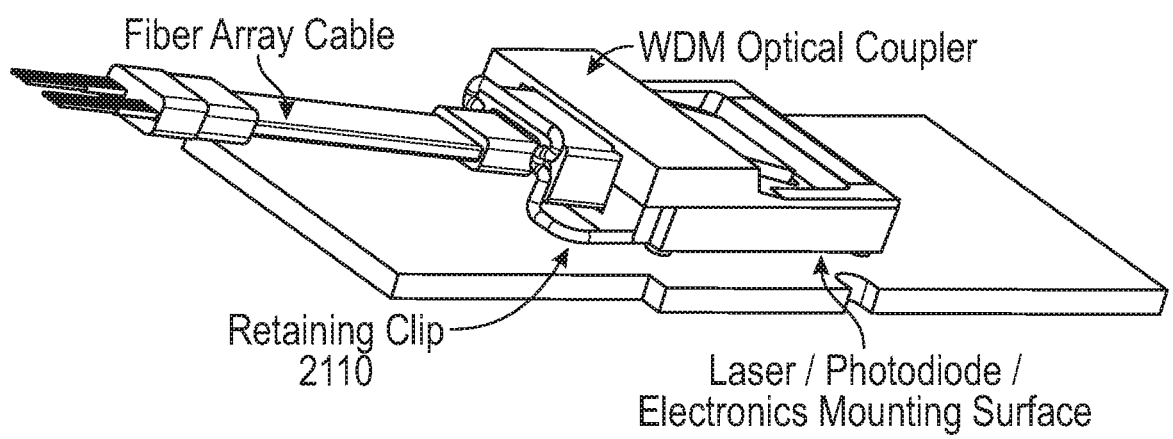
FIG. 21 is an isometric top view of an exemplary transceiver assembly, mounted on a substrate, having a retaining clip for a fiber cable, according to one or more exemplary embodiments of the present disclosure.

FIG. 21 is an isometric top view of an exemplary transceiver assembly, according to one or more exemplary embodiments of the present disclosure. The transceiver assembly shown in FIG. 21 can be mounted to a substrate or circuit board in a manner similar to the exemplary embodiments shown in FIG. 20. The exemplary transceiver assembly can include an optical coupler similar to those discussed above including, e.g., FIGS. 16-17 (2×8 WDM optical coupler) or FIG. 18-19 (2×12 WDM optical coupler). FIG. 21 also illustrates a fiber array cable (comprising, e.g., eight or twelve fibers) plugged into the transceiver assembly using exemplary mechanical features such as the fiber connector stops 1710 and the fiber alignment pins 1720 shown in FIG. 18. The fiber array cable can also be held in place by a retaining clip 2110. In various embodiments, the retaining clip 2110 can be a separate unit or assembly mounted to the substrate, or it can be integrally formed or assembled with the optical coupler itself.

Figure 22:
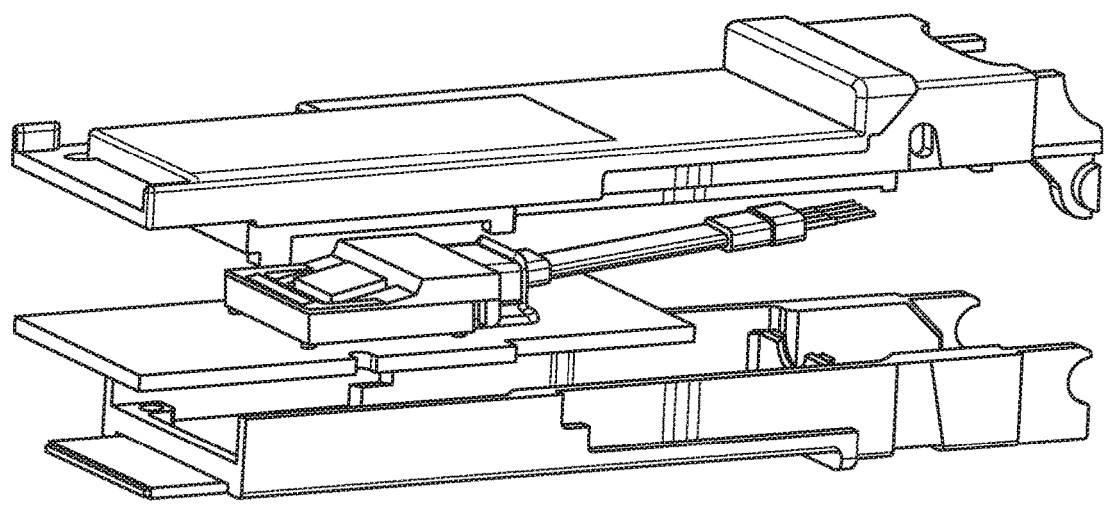
FIG. 22 is an isometric top view of an exemplary transceiver assembly, such as shown in FIG. 21, mounted in a housing, according to one or more exemplary embodiments of the present disclosure.

FIG. 22 is an isometric top view of another exemplary transceiver assembly, according to one or more exemplary embodiments of the present disclosure. The exemplary assembly shown in FIG. 22 can include an external housing that encloses an internal transceiver assembly, such as the transceiver assembly shown in FIG. 21.

Figure 23:
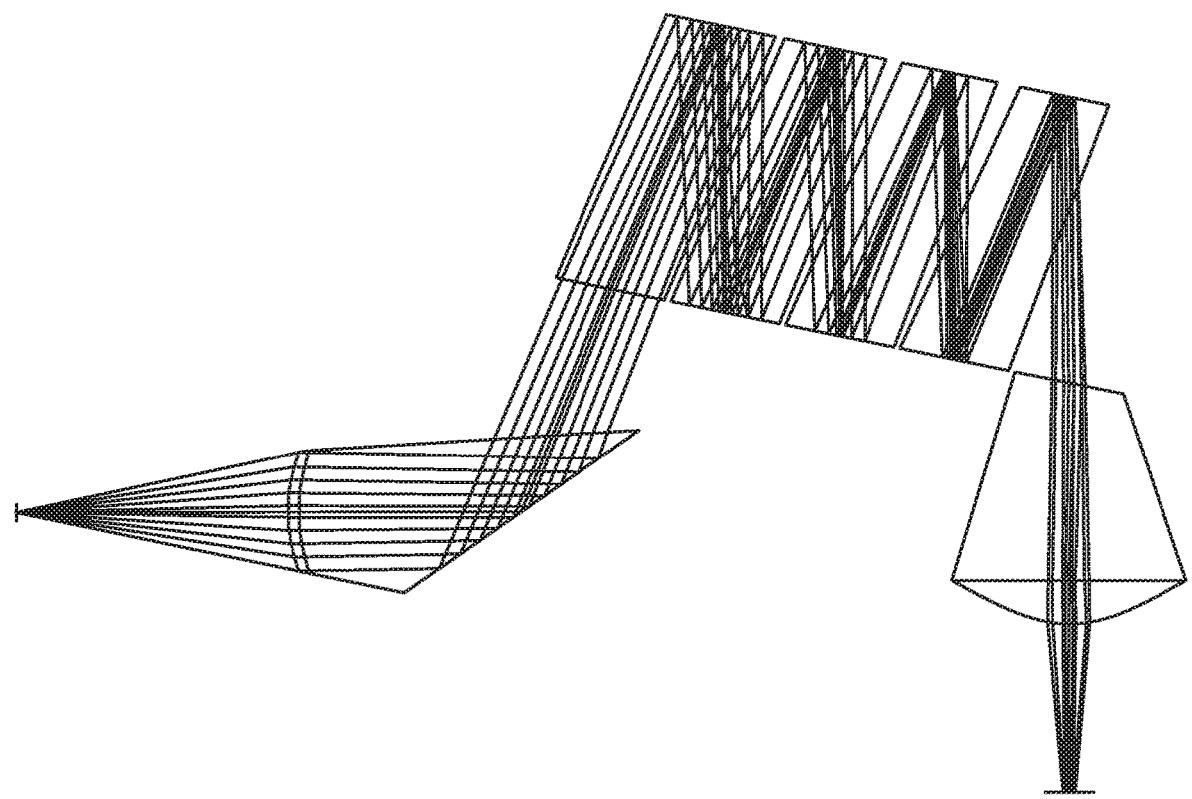
FIG. 23 shows an exemplary design of a multi-channel optical coupler according to various embodiments of the present disclosure.

FIG. 23 shows an exemplary design of a multi-channel optical coupler according to various embodiments of the present disclosure. FIG. 23 also illustrates the paths of various optical channels through the exemplary multi-channel optical coupler design. This particular design illustrated in FIG. 23 can be used in a four-wavelength ($\lambda 1$-$\lambda 4$) multiplexer/demultiplexer with n fibers (F1-Fn) in a parallel assembly. For example, if four transmit and four receive fibers (n'8) were used in the optical assembly, the light from each fiber would follow the path of the traces for their respective position.

The exemplary design shown in FIG. 23 is based on various parameter values. "Fiber pitch" refers the distance between the centerlines of adjacent fibers in a parallel fiber array. Typically, the minimum fiber pitch for parallel fibers is 250 microns, and the design illustrated by FIG. 23 uses this value. "Intra-fiber lens pitch" refers the distance between centerlines of adjacent lenses of a lens array within the optical, and typically can be equal to the fiber pitch. The design illustrated by FIG. 23 follows this principle with an intra-fiber lens pitch of 250 microns. However, this parameter can be larger or smaller than the fiber pitch, depending on the particular optical design configuration. In addition, the design shown in FIG. 23 employs a reflective coating with a 15-micron thickness.

Simulation results for the design shown in FIG. 23 indicated that wavelengths $\lambda 1$-$\lambda 3$ within each fiber do not stray outside of their respective optical paths within the coupler, and therefore doesn't cause any crosstalk to the adjacent channels. However, simulation results showed that wavelength $\lambda 4$ within each fiber does stray outside of its optical path within the coupler and introduce crosstalk into wavelength $\lambda 4$ of an adjacent fiber. Based on the simulation results, however, this crosstalk is no more than −31.7 dB.

In other words, crosstalk for (F1, $\lambda 4$) can only come from (F2, $\lambda 4$), and crosstalk for (F4, $\lambda 4$) can only come from (F3, $\lambda 4$). Each crosstalk would be −31.7 dB. In contrast, (F2, $\lambda 4$) suffers from crosstalk from both (F1, $\lambda 4$) and (F3, $\lambda 4$), while (F3, $\lambda 4$) suffers from crosstalk from both (F2, $\lambda 4$) and (F4, $\lambda 4$). Each crosstalk would be double the lesser amount, i.e., −28.7 dB. Table 1 below summarizes these simulation results. Note that "F1-F1" represents the percentage of desired signal that stays within each channel ($\lambda$) of F1.

TABLE 1

|  | $\lambda 1$ | $\lambda 2$ | $\lambda 3$ | $\lambda 4$ |
| --- | --- | --- | --- | --- |
| F1-F1 (%) | 99.98 | 99.98 | 99.98 | 96.79 |
| F1-F2 crosstalk (%) | 0 | 0 | 0 | 0.07 |
| F1-F2 crosstalk (dB) | N/A | N/A | N/A | −31.7 |
| F3-F2 crosstalk (dB) | N/A | N/A | N/A | −31.7 |
| Total crosstalk on F2 (dB) | N/A | N/A | N/A | −28.7 |

In this exemplary multi-channel optical coupler design, the intra-fiber lens pitch will determine the physical size of the filters within the optical block. The smaller the lens pitch, the more difficult it is to manufacture and assemble the filters. Therefore, one could increase the lens pitch to increase the size of the filters. However, a greater lens pitch will increase the overall optical path and the divergence of each optical beam outside its intended optical path, resulting in increased crosstalk. For example, a lens pitch greater than 250 microns in the arrangement shown in FIG. 23 will likely increase crosstalk on $\lambda 4$ and may introduce crosstalk on $\lambda 3$ or other channels. Even so, the example design shown in FIG. 23 illustrates that embodiments of the present disclosure provide a range of parameter choices that facilitate manufacturability while meeting minimum crosstalk performance requirements, such as no more than −10 dB.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. An optical coupler for a plurality of optical fibers, comprising:
    a molded coupling module comprising a first surface, a second surface, a lens array receptacle, and one or more fiber receptacles configured to receive the plurality of optical fibers;
    an optical arrangement comprising:
        a particular surface carrying a reflective coating, and
        a further surface opposite the particular surface and carrying a plurality of optical filters, each optical filter configured to pass a single optical wavelength,
        wherein the optical arrangement has a thickness, T, between the particular surface and the further surface;
    a first lens array comprising a plurality of first lenses arranged with a first lens pitch, wherein the first lens array is arranged with the lens array receptacle such that each first lens is associated with a particular optical fiber and is optically aligned with the plurality of optical filters via at least the reflective coating; and
    a second lens array comprising a plurality of second lenses arranged with a second lens pitch, wherein the second lens array is arranged with the second surface of the molded coupling module such that each lens of the second lens array is optically aligned with a corresponding one of the plurality of optical filters,
    wherein T, the first lens pitch, and the second lens pitch are configured such that the optical coupler produces no more than −10 dB of crosstalk on any of the optical wavelengths passed by the plurality of optical filters, and
    wherein the first lens array is configured such that each lens in the first lens array is non-collimating with respect to light received from a corresponding fiber.

2. The optical coupler of claim 1, further comprising one or more optical beam reflectors arranged with the second surface of the molded coupling module, such that the first lens array is optically aligned with the plurality of optical filters via the one or more optical beam reflectors and the reflective coating.

3. The optical coupler of claim 1, wherein the further surface of the optical arrangement is mounted to the first surface of the molded coupling module such that the first lens array is optically aligned with the plurality of optical filters via only the reflective coating.

4. The optical coupler of claim 1, wherein the optical arrangement is configured such that the further surface carries a substantially opaque coating having a footprint that substantially surrounds the perimeter of the plurality of optical filters and substantially covers any intermediate gaps between the plurality of optical filters without substantially interfering with the direct optical paths through the plurality of optical filters.

5. The optical coupler of claim 1, wherein the plurality of optical filters are arranged in an array comprising:
    a number of rows corresponding to the plurality of fibers; and
    a number of columns corresponding to a maximum number of optical wavelengths supported for any of the plurality of optical fibers.

6. The optical coupler of claim 5, wherein all optical filters of a particular column are configured to pass the same optical wavelength.

7. The optical coupler of claim 5, wherein a subset of the optical filters of a particular column are configured to pass a different optical wavelength than a different subset of the optical filters of the particular column.

8. The optical coupler of claim 1, wherein each lens in the second lens array is non-collimating with respect to light received from the corresponding optical filter.

9. The optical coupler of claim 1, wherein the first and second surfaces are substantially parallel, and the second lens array comprises a plurality of off-axis, aspherical lenses.

10. The optical coupler of claim 1, wherein the first and second surfaces are substantially non-parallel, and the second lens array comprises a plurality of on-axis, aspherical lenses.

11. The optical coupler of claim 1, further comprising a plurality of optical inserts, each optical insert coupled to a particular lens of the first lens array and positioned in optical alignment between the particular lens and a position, within one of the fiber receptacles, corresponding to an end of an optical fiber.

12. The optical coupler of claim 1, wherein the one or more fiber receptacles are configured to mate with a plurality of multi-mode fibers having respective ends polished to angles, relative to the respective longitudinal axes of the fibers, of less than or equal to 85 degrees.

13. The optical coupler of claim 12, wherein:
    the one of more fiber receptacles comprise a plurality of fiber stubs;
    each particular stub of the plurality of fiber stubs corresponds to a particular fiber of the plurality of multi-mode fibers; and
    each particular stub has an end polished at a particular angle to mate with a polished end of the corresponding particular fiber.

14. A wavelength-division multiplexer comprising:
    a substrate;
    the optical coupler of claim 1 mounted to the substrate; and
    a plurality of light sources mounted to the substrate and configured such that each light source is optically aligned with a corresponding lens of the second lens array.

15. A wavelength-division demultiplexer comprising:
    a substrate;
    the optical coupler of claim 1 mounted to the substrate; and
    a plurality of photodiodes mounted to the substrate and configured such that each photodiode is optically aligned with a corresponding lens of the second lens array.

16. A wavelength-division transmitter/receiver comprising:
    a substrate;

the optical coupler of claim 1 mounted to the substrate;
a plurality of photodiodes mounted to the substrate and configured such that each photodiode is optically aligned with a corresponding lens of a first portion of the second lens array; and
a plurality of light sources mounted to the substrate and configured such that each light source is optically aligned with a corresponding lens of a second portion of the second lens array.

17. A fiber-to-fiber multiplexer/demultiplexer comprising:
a substrate;
the optical coupler of claim 1 mounted to the substrate; and
a further plurality of fiber receptacles mounted to the substrate such that, within each of the further fiber receptacles, a position corresponding to the end of an optical fiber is optically aligned with a corresponding lens of the second lens array.

18. An optical coupler for a plurality of optical fibers, comprising:
a molded coupling module comprising a first surface, a second surface, a lens array receptacle, and one or more fiber receptacles configured to receive the plurality of optical fibers;
an optical arrangement comprising:
a particular surface carrying a reflective coating, and
a further surface opposite the particular surface and carrying a plurality of optical filters, each optical filter configured to pass a single optical wavelength,
wherein the optical arrangement has a thickness, T, between the particular surface and the further surface;
a first lens array comprising a plurality of first lenses arranged with a first lens pitch, wherein the first lens array is arranged with the lens array receptacle such that each first lens is associated with a particular optical fiber and is optically aligned with the plurality of optical filters via at least the reflective coating; and
a second lens array comprising a plurality of second lenses arranged with a second lens pitch, wherein the second lens array is arranged with the second surface of the molded coupling module such that each lens of the second lens array is optically aligned with a corresponding one of the plurality of optical filters,
wherein T, the first lens pitch, and the second lens pitch are configured such that the optical coupler produces no more than −10 dB of crosstalk on any of the optical wavelengths passed by the plurality of optical filters,
wherein the optical arrangement comprises an optical block having the particular surface and the further surface on opposite faces, and
wherein the further surface of the optical block is mounted to the first surface of the molded coupling module.

19. The optical coupler of claim 18, wherein the plurality of optical filters are arranged in an array comprising:
a number of rows corresponding to the plurality of fibers; and
a number of columns corresponding to a maximum number of optical wavelengths supported for any of the plurality of optical fibers.

20. An optical coupler for a plurality of optical fibers, comprising:
a molded coupling module comprising a first surface, a second surface, a lens array receptacle, and one or more fiber receptacles configured to receive the plurality of optical fibers;
an optical arrangement comprising:
a particular surface carrying a reflective coating, and
a further surface opposite the particular surface and carrying a plurality of optical filters, each optical filter configured to pass a single optical wavelength,
wherein the optical arrangement has a thickness, T, between the particular surface and the further surface;
a first lens array comprising a plurality of first lenses arranged with a first lens pitch,
wherein the first lens array is arranged with the lens array receptacle such that each first lens is associated with a particular optical fiber and is optically aligned with the plurality of optical filters via at least the reflective coating; and
a second lens array comprising a plurality of second lenses arranged with a second lens pitch, wherein the second lens array is arranged with the second surface of the molded coupling module such that each lens of the second lens array is optically aligned with a corresponding one of the plurality of optical filters,
wherein T, the first lens pitch, and the second lens pitch are configured such that the optical coupler produces no more than −10 dB of crosstalk on any of the optical wavelengths passed by the plurality of optical filters,
wherein the molded coupling module comprises the further surface on which the plurality of optical filters are mounted, and
wherein the particular surface carrying the reflective coating is mounted to the first surface of the molded coupling module, such that a cavity exists between the reflective coating and the plurality of optical filters.

* * * * *